(12) United States Patent
Xu et al.

(10) Patent No.: US 12,199,522 B2
(45) Date of Patent: Jan. 14, 2025

(54) METHOD AND APPARATUS FOR DETECTING SHORT CIRCUIT OF INVERTER, AND INVERTER

(71) Applicant: Huawei Digital Power Technologies Co., Ltd., Shenzhen (CN)

(72) Inventors: Zhiwu Xu, Shanghai (CN); Yongbing Gao, Shanghai (CN); Niantao Jiang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 273 days.

(21) Appl. No.: 17/826,395

(22) Filed: May 27, 2022

(65) Prior Publication Data

US 2022/0294361 A1     Sep. 15, 2022

Related U.S. Application Data

(63) Continuation of application No. PCT/CN2020/110090, filed on Aug. 19, 2020.

(30) Foreign Application Priority Data

Nov. 29, 2019     (CN) .......................... 201911204153.7

(51) Int. Cl.
*H02M 7/48*         (2007.01)
*H02J 3/38*         (2006.01)
(Continued)

(52) U.S. Cl.
CPC .............. *H02M 7/48* (2013.01); *H02J 3/381* (2013.01); *H02M 1/32* (2013.01); *H02S 40/32* (2014.12); *H02J 2300/24* (2020.01)

(58) Field of Classification Search
CPC . H02M 7/48; H02M 1/32; H02S 40/32; H02J 3/381; H02J 2300/24
(Continued)

(56) References Cited

U.S. PATENT DOCUMENTS

2010/0046124 A1\* 2/2010 Hibi ..................... H02H 7/1213
                                                                361/18
2015/0137784 A1    5/2015 Sugawara
(Continued)

FOREIGN PATENT DOCUMENTS

CN         102520304 A     6/2012
CN         102804574 A     11/2012
(Continued)

OTHER PUBLICATIONS

State Grid Shanxi Electric Power Company Group, Distributed Photovoltaic Grid Connection Guide, Zhejiang People''s Publishing House, 2016, with an English abstract, total 7 pages.
(Continued)

*Primary Examiner* — Yemane Mehari

(57) ABSTRACT

A method and an apparatus for detecting a short circuit of an inverter, and an inverter are provided. A voltage of a common bus is increased when a plurality of boost circuits in the inverter are all in a non-working state, and after circuit parameters of input sides of all the plurality of boost circuits are detected, a boost circuit in which a diode is short-circuited in the plurality of boost circuits is further determined based on the circuit parameters of the input sides of the boost circuits. According to the method and the apparatus for detecting a short circuit of an inverter, and the inverter, circuit complexity of the inverter can be reduced, and circuit complexity of a photovoltaic power generation system including the inverter is reduced.

16 Claims, 13 Drawing Sheets

(51) Int. Cl.
*H02M 1/32* (2007.01)
*H02S 40/32* (2014.01)

(58) Field of Classification Search
USPC .......................................................... 363/13
See application file for complete search history.

(56) References Cited

U.S. PATENT DOCUMENTS

| | | | | |
|---|---|---|---|---|
| 2015/0280423 | A1* | 10/2015 | Bremicker | ............ H02M 3/155 307/71 |
| 2019/0288515 | A1* | 9/2019 | Nishi | ................... H02H 1/0007 |

FOREIGN PATENT DOCUMENTS

| | | |
|---|---|---|
| CN | 103973149 A | 8/2014 |
| CN | 104977471 A | 10/2015 |
| CN | 105356840 A | 2/2016 |
| CN | 106602504 A | 4/2017 |
| CN | 107017767 A | 8/2017 |
| CN | 207010572 U | 2/2018 |
| CN | 108736712 A | 11/2018 |
| CN | 110429644 A | 11/2019 |
| CN | 110888085 A | 3/2020 |
| EP | 2760118 A2 | 7/2014 |
| EP | 2920858 B1 | 6/2016 |
| EP | 3252562 A1 | 12/2017 |
| EP | 3393029 A1 | 10/2018 |
| EP | 4030602 A1 * | 7/2022 ............... H02H 7/12 |
| JP | 2001257377 A | 9/2001 |
| JP | 2007043764 A | 2/2007 |
| JP | 5277527 B2 | 8/2013 |
| WO | 2017212572 A1 | 12/2017 |

OTHER PUBLICATIONS

International Search Report and Written Opinion issued in PCT/CN2020/110090, dated Oct. 28, 2020, 12 pages.
Extended European Search Report issued in EP20894048.6, dated Dec. 15, 2022, 7 pages.
Office Action issued in CN201911204153.7, dated Jan. 27, 2021, 27 pages.
Office Action issued in CN201911204153.7, dated Jul. 1, 2021, 30 pages.

* cited by examiner

METHOD AND APPARATUS FOR DETECTING SHORT CIRCUIT OF INVERTER, AND INVERTER

CROSS-REFERENCE TO RELATED APPLICATIONS

This application is a continuation of International Application No. PCT/CN2020/110090, filed on Aug. 19, 2020, which claims priority to Chinese Patent Application No. 201911204153.7, filed on Nov. 29, 2019. The disclosures of the aforementioned applications are hereby incorporated by reference in their entireties.

TECHNICAL FIELD

This application relates to the field of photovoltaic technologies, and in particular, to a method and an apparatus for detecting a short circuit of an inverter, and an inverter.

BACKGROUND

With advancement of science and technology and continuous development of energy technology, solar power generation is gradually widely used due to advantages, for example, solar energy generation is renewable and clean. As a solar power generation manner, a solar photovoltaic power generation system can directly convert solar radiant energy into electric energy of a direct current by using a photovoltaic effect of a solar cell semiconductor material (a photovoltaic module). The photovoltaic module outputs a direct current, but an alternating current exists in a grid. Therefore, an inverter needs to be disposed between the photovoltaic module and the grid, to convert the direct current (DC) generated by the photovoltaic module into the alternating current (AC) having a grid frequency. To increase a grid-connected voltage of the inverter, boost circuits that are one-to-one connected to photovoltaic modules are further disposed in the inverter. The inverter first increases, by using the boost circuit, a voltage of a direct current generated by the photovoltaic module, and then converts the direct current into an alternating current, to output the alternating current to the grid. The boost circuit is mainly implemented by using a boost circuit. The boost circuit increases a voltage of an input side of the boost circuit through high-frequency on/off of a switching transistor in cooperation with charging and discharging of an inductor, and then outputs the voltage from an output side thereof. To avoid a short circuit caused because the input side and the output side of the boost circuit are directly connected, a diode is disposed between the input side and the output side of the boost circuit, so that a current can enter the boost circuit only from the input side and is output only from the output side.

One side of the boost circuit is connected to the photovoltaic module, and the other side thereof is connected to a direct current bus. Therefore, once the diode in the boost circuit is short-circuited, a voltage of the direct current bus is high, and a voltage of the photovoltaic module is low. In the boost circuit, a backflow current in a direction from the direct current bus to the photovoltaic module occurs. If the current that is input into the photovoltaic module is excessively large, the photovoltaic module is damaged, or even a fire is caused. Consequently, a serious safety accident is caused, and an economic loss is caused. Therefore, to detect whether the diode in the boost circuit is short-circuited, when boost circuits disposed in some inverters are connected to photovoltaic modules, a fuse with a melting threshold is disposed between each boost circuit and photovoltaic module. When the diode in the boost circuit is short-circuited, a backflow current occurs in a direction from the boost circuit to the photovoltaic module, and when the backflow current is greater than the melting threshold of the fuse, the fuse melts, and the backflow current is not input into the photovoltaic module, to protect the photovoltaic module.

However, in a conventional technology, operation and maintenance personnel need to observe whether the fuse melts, to determine whether the diode in the boost circuit is short-circuited. Costs of disposing the fuse in the inverter are increased, and workload of maintaining the inverter and the fuse is increased.

SUMMARY

This application provides a method and an apparatus for detecting a short circuit of an inverter, and an inverter, to resolve a problem that a current flows back when a diode in a boost circuit in the inverter is short-circuited. This application has technical effects of reducing costs of the inverter and reducing maintenance workload of the inverter.

A first aspect of this application provides a method for detecting a short circuit of an inverter, used to detect whether an inverter is short-circuited. The method may be performed by a processing module or a processor in the inverter. Specifically, when a plurality of boost circuits in the inverter are all in a non-working state, the processing module may increase a voltage of a common bus connected to the plurality of boost circuits, and then detect a circuit parameter of an input side of each boost circuit in the plurality of boost circuits, to determine a short-circuited boost circuit in the plurality of boost circuits in the inverter based on the circuit parameter of each boost circuit.

In conclusion, in a method for detecting a short circuit of an inverter provided in this embodiment, the processing module in the inverter can detect, by using software, whether the boost circuit in the inverter is short-circuited. Therefore, no additional fuse needs to be disposed in the inverter, so that circuit complexity of the inverter can be reduced, and circuit complexity of a photovoltaic power generation system including the inverter can be reduced.

In an embodiment of the first aspect of this application, if the circuit parameter that is of the input side of the boost circuit and that is specifically detected by the processing module is a voltage, the processing module may detect a voltage of the input side of each boost circuit in the plurality of boost circuits in the inverter, and determine that a boost circuit whose input side has a voltage equal to a second voltage in the plurality of boost circuits is short-circuited.

In conclusion, in the inverter detection method provided in this embodiment, after the voltage of the common bus connected to the boost circuit is increased, voltages of two sides of a short-circuited boost circuit are the same. Therefore, a direct manner in which whether the boost circuit is short-circuited is detected by using the voltage of the input side of the boost circuit may be used. This can improve efficiency of detecting whether the boost circuit in the inverter is short-circuited.

In an embodiment of the first aspect of this application, if the circuit parameter that is of the input side of the boost circuit and that is specifically detected by the processing module is a current, the processing module may detect whether the input side of each boost circuit in the plurality of boost circuits in the inverter has a backflow current, and determine that a boost circuit having a backflow current is short-circuited.

In conclusion, in the inverter detection method provided in this embodiment, after the voltage of the common bus connected to the boost circuit is increased, a voltage of a photovoltaic string connected to a short-circuited boost circuit is definitely lower than the voltage of the common bus. Therefore, a backflow current that exists in a direction from the common bus to the photovoltaic string and that passes through the short-circuited boost circuit occurs. Therefore, in this embodiment, a direct manner in which whether the boost circuit is short-circuited can be detected by detecting whether a backflow current flows through the boost circuit may be used. This can also improve efficiency of detecting whether the boost circuit in the inverter is short-circuited.

In an embodiment of the first aspect of this application, the method for detecting a short circuit of an inverter is applied to a photovoltaic power generation system. In this case, the input sides of the boost circuits in the inverter are connected to photovoltaic strings in a one-to-one correspondence manner. In addition, a direct current/alternating current inverter module in the inverter is specifically configured to: convert a direct current into an alternating current, and output the alternating current to a grid, to implement photovoltaic power generation.

In conclusion, in the method for detecting a short circuit of an inverter provided in this embodiment, whether the inverter in the photovoltaic power generation system is short-circuited can be determined. Particularly, when photovoltaic strings connected to the inverter are expensive and a quantity of photovoltaic strings is large, in this embodiment, whether the inverter is short-circuited can be quickly and effectively detected. This can reduce costs of monitoring the inverter, and can also ensure that the photovoltaic string is not damaged, to protect economic benefits.

In an embodiment of the first aspect of this application, after determining the short-circuited boost circuit in the plurality of boost circuits, the processing module further switches, to a working state, a boost circuit that is not short-circuited in the plurality of boost circuits, and controls, to be lower than a preset power, an output power of a photovoltaic string connected to the boost circuit that is not short-circuited, to protect a photovoltaic string connected to the short-circuited boost circuit.

In conclusion, in the method for detecting a short circuit of an inverter provided in this embodiment, whether the plurality of boost circuits in the inverter are short-circuited is detected.

In addition, after the short-circuited boost circuit in the plurality of boost circuits is detected, the voltage of the bus can be further reduced by enabling the boost circuit that is not short-circuited, to reduce the output power of the photovoltaic string connected to the short-circuited boost circuit, and protect the photovoltaic string connected to the short-circuited boost circuit. Therefore, the photovoltaic string can be automatically protected after the boost circuit is short-circuited, so that measures are taken before operation and maintenance personnel find and process the short-circuited boost circuit, to ensure that the photovoltaic string is not damaged. This further improves safety performance of the photovoltaic power generation system.

In an embodiment of the first aspect of this application, the processing module specifically controls, to be less than a third voltage, a voltage of an output side of the boost circuit that is not short-circuited, so that the output power of the photovoltaic string connected to the boost circuit that is not short-circuited is lower than the preset power, where the third voltage is of a voltage that is of an output side of the short-circuited boost circuit and that exists when the plurality of boost circuits are all in a non-working state.

In conclusion, in the method for detecting a short circuit of an inverter provided in this embodiment, based on a characteristic, of the boost circuit, of increasing a voltage of an output side or reducing a voltage of an input side, the output power of the photovoltaic string is reduced by reducing a voltage of an input side on the left of the boost circuit that is not short-circuited, so that the boost circuit that is not short-circuited protects the short-circuited boost circuit in a simple and effective manner.

In an embodiment of the first aspect of this application, before detecting whether the plurality of boost circuits in the inverter are short-circuited, the processing module may further first switch the plurality of boost circuits to a non-working state.

In conclusion, in the method for detecting a short circuit of an inverter provided in this embodiment, specifically, the processing module may actively switch the plurality of boost circuits in the inverter to a non-working state when detection needs to be performed or based on an indication of a user. In this way, after the inverter meets an execution condition in this application, whether the plurality of boost circuits in the inverter are short-circuited is detected, to enrich an application scenario of this embodiment.

In an embodiment of the first aspect of this application, the processing module specifically determines a first boost circuit whose input side has a lowest voltage in the plurality of boost circuits, and switches the first boost circuit to a working state, to boost the common bus. A direct current that is output by the first boost circuit to the common bus in a working state is used to increase the voltage of the common bus from a first voltage to the second voltage.

In conclusion, in the method for detecting a short circuit of an inverter provided in this embodiment, when the short-circuited boost circuit exists, the first boost circuit whose input side has a lowest voltage in the boost circuits is definitely not short-circuited. Therefore, the first boost circuit may be enabled, so that the boost circuit that is not short-circuited works, to increase the voltage of the common bus. In addition, a specific boost value is controllable, so that the voltage of the common bus can be increased in a more accurate, safe, and effective manner.

In an embodiment of the first aspect of this application, the processing module specifically determines a second boost circuit from the plurality of boost circuits; and switches the second boost circuit to a working state, and controls the second boost circuit to boost a direct current of an input side based on a duty cycle less than a preset threshold, and then output the direct current to the common bus, to boost the common bus. The direct current is used to increase the voltage of the common bus from a first voltage to the second voltage.

In conclusion, in the method for detecting a short circuit of an inverter provided in this embodiment, during detection, any boost circuit may be selected to increase the voltage of the common bus, so that the boost circuit does not need to be detected. Once the boost circuit is short-circuited and cannot increase the voltage of the common bus, the boost circuit may be replaced by any other boost circuit to increase the voltage of the common bus. Therefore, in this embodiment, an operation procedure of increasing the voltage of the common bus is simple. This can improve efficiency of detecting a short circuit of the inverter.

In an embodiment of the first aspect of this application, the inverter to which this application is applied further includes an alternating current/direct current rectifier module, an input side of the alternating current/direct current rectifier module is connected to an output side of the direct current/alternating current rectifier module, and an output side of the alternating current/direct current rectifier module is connected to the common bus. In this case, in this embodiment, a boost module used as an execution body may specifically convert an alternating current into a direct current by using the alternating current/direct current rectifier module, and output the direct current to the common bus, where the direct current that is output by the alternating current/direct current rectifier module is used to increase the voltage of the common bus from a first voltage to the second voltage.

In conclusion, in the method for detecting a short circuit of an inverter provided in this embodiment, on a path on which the common bus outputs electric energy to the grid, the output electric energy can be directly collected and sent back to the common bus, to increase the voltage of the common bus. Therefore, electric energy utilization is improved in a direct manner, and the voltage of the common bus can be further increased without operating any boost circuit in the inverter.

A second aspect of this application provides an apparatus for detecting a short circuit of an inverter. The apparatus may be configured to perform the method for detecting a short circuit of an inverter provided in the first aspect of this application. The apparatus includes a function used to implement a behavior of the processing module used as an execution body in the foregoing method implementation. The function may be implemented by hardware, or may be implemented by hardware executing corresponding software. The hardware or the software includes one or more modules corresponding to the function.

A third aspect of this application provides a computer program product including instructions. When the computer program product is run on a device, the device is enabled to perform the method in the first aspect or the possible implementations of the first aspect.

A fourth aspect of this application provides a computer-readable storage medium. The computer-readable storage medium stores instructions. When the instructions are run on a device, the device is enabled to perform the method in the first aspect or the possible implementations of the first aspect.

A fifth aspect of this application provides a chip system. The chip system includes a processor, and may further include a memory, configured to implement a function of the processing module used as an execution body in the method in the first aspect. The chip system may include a chip, or may include a chip and another discrete component.

A sixth aspect of this application provides an inverter, including a plurality of boost circuits, a common bus, and a direct current/alternating current inverter module, where output sides of the plurality of boost circuits are all connected in parallel with the common bus, the common bus is further connected in parallel with the direct current/alternating current inverter module, a direct current is input into an input side of each boost circuit, the boost circuit is configured to: after performing boost processing on the direct current, send the direct current to the direct current/alternating current inverter module by using the common bus, the direct current/alternating current inverter module is configured to: convert the boosted direct current into an alternating current, and then output the alternating current, a switching transistor in each boost circuit is connected in series with an overcurrent protector, and the overcurrent protector is configured to be disconnected when a current flowing through the switching transistor is excessively large, to perform overcurrent protection.

In conclusion, according to the inverter provided in the sixth aspect of this application, the switching transistor in each boost circuit is connected in series with an overcurrent protector, and the overcurrent protector can be disconnected when the switching transistor in the boost circuit is short-circuited, to provide protection for the switching transistor. Therefore, the inverter provided in this application has high safety performance.

A seventh aspect of this application provides a method for detecting a short circuit of an inverter. The method may be used to detect whether the inverter provided in the sixth aspect of this application is short-circuited, and the method includes: When a plurality of boost circuits are all in a non-working state, a processing module in the inverter increases a voltage of a common bus from a first voltage to a second voltage. Then, the processing module in the inverter may detect a short-circuited boost circuit in the plurality of boost circuits based on a state of an overcurrent protector in each boost circuit in the plurality of boost circuits.

In conclusion, in the method for detecting a short circuit of an inverter provided in this embodiment, the state of the overcurrent protector in each boost circuit in the inverter can be detected, to determine that a switching transistor in a boost circuit corresponding to a disconnected overcurrent protector is short-circuited. Therefore, in the method for detecting a short circuit of an inverter provided in this embodiment, on a basis of protecting each boost circuit by the overcurrent protector, when the overcurrent protector is short-circuited, the processing module can further autonomously determine the short-circuited boost circuit more intelligently, to improve efficiency of detecting a short circuit of the boost circuit in the inverter.

An eighth aspect of this application provides an apparatus for detecting a short circuit of an inverter. The apparatus may be configured to perform the method for detecting a short circuit of an inverter provided in the seventh aspect of this application. The apparatus includes a function used to implement a behavior of the processing module used as an execution body in the foregoing method implementation. The function may be implemented by hardware, or may be implemented by hardware executing corresponding software. The hardware or the software includes one or more modules corresponding to the function.

A ninth aspect of this application provides a computer program product including instructions. When the computer program product is run on a device, the device is enabled to perform the method in the implementations of the seventh aspect.

A tenth aspect of this application provides a computer-readable storage medium. The computer-readable storage medium stores instructions, and when the instructions are run on a device, the device is enabled to perform the method in the seventh aspect.

An eleventh aspect of this application provides a chip system. The chip system includes a processor, and may further include a memory, configured to implement a function of the processing module used as an execution body in the method in the seventh aspect. The chip system may include a chip, or may include a chip and another discrete component.

DESCRIPTION OF EMBODIMENTS

Figure 1:
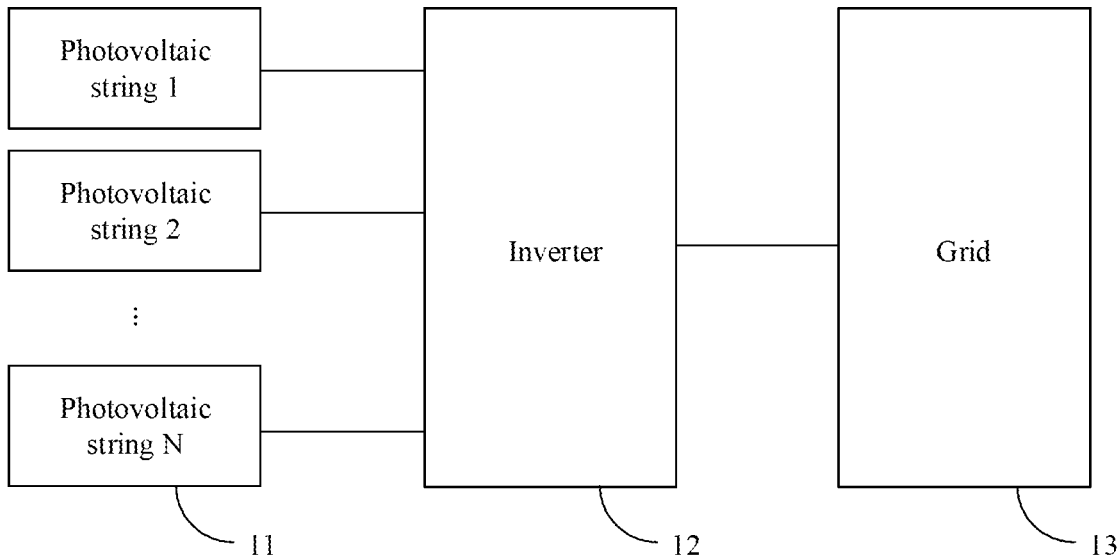
FIG. 1 is a schematic diagram of an application scenario of this application.

FIG. 1 is a schematic diagram of an application scenario of this application. As shown in FIG. 1, this application may be applied to a photovoltaic power generation system in the field of photovoltaic power generation technologies. The photovoltaic power generation system may include at least one photovoltaic string 11, an inverter 12, and a grid 13. In the system shown in FIG. 1, N photovoltaic strings 11 are used as an example. All the N photovoltaic strings are separately connected to the inverter 12, and the inverter 12 is further connected to the grid 13.

Specifically, each photovoltaic string 11 in the N photovoltaic strings 11 may be obtained after a plurality of photovoltaic modules are connected in series and/or connected in parallel. The photovoltaic module may be a solar panel. Each photovoltaic module may be configured to: collect solar energy, and convert the solar energy into electric energy. Each photovoltaic string 11 may jointly transmit, to the inverter 12, electric energy generated by all the photovoltaic modules. The inverter 12 may jointly transmit, to the grid 13, electric energy transmitted by all the photovoltaic strings 11. In an application scenario such as a large-sized photovoltaic station, the photovoltaic power generation system in which a plurality of photovoltaic strings 11 are connected to the grid 13 by using a same inverter 12 can improve transmission efficiency. In addition, the electric energy generated by the photovoltaic module is represented in a form of a direct current, and electric energy transmitted by the grid is represented in a form of a high-voltage alternating current. Therefore, the inverter 12 needs to convert, into alternating currents, direct currents generated by the N photovoltaic strings 11, and then transmit the alternating currents to the grid 13.

Figure 2:
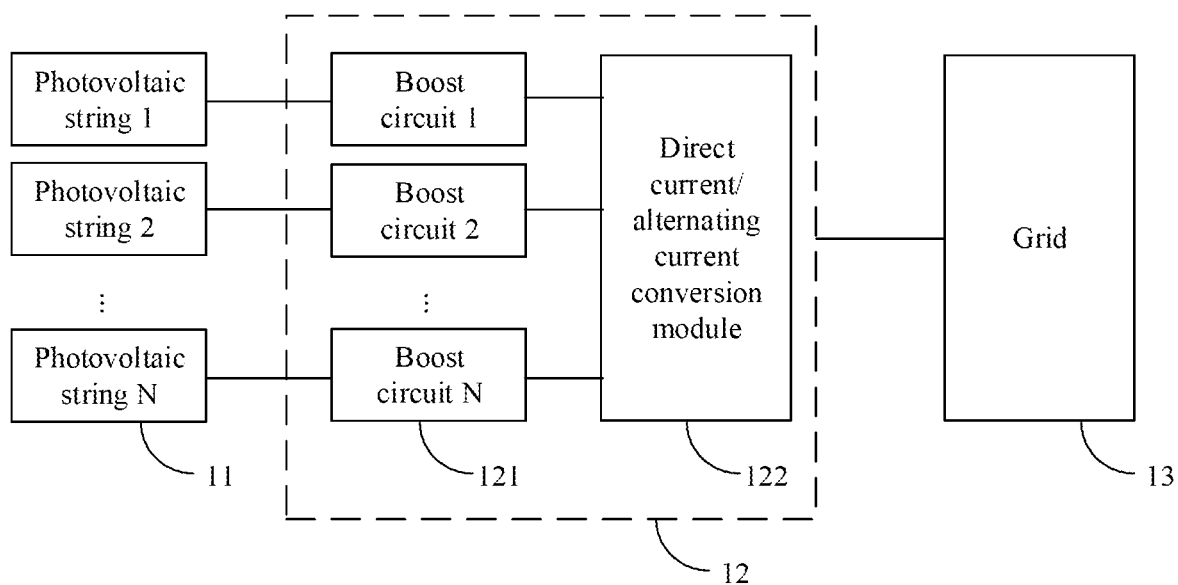
FIG. 2 is a schematic diagram of an internal structure of an inverter.

Further, a voltage of the direct current generated by the photovoltaic string is low, according to Joule's law, a loss is lower when electric energy is transmitted at a higher voltage. Therefore, to increase a grid-connected voltage of the inverter to improve power generation efficiency of the photovoltaic power generation system, for inverters in some photovoltaic power generation systems, a corresponding boost circuit is disposed for a photovoltaic string connected to each inverter, so that the inverter can further perform boost processing on a direct current that has a low voltage and that is generated by the photovoltaic string. For example, FIG. 2 is a schematic diagram of an internal structure of an inverter. On a basis of the photovoltaic power generation system shown in FIG. 1, N boost circuits that are in a one-to-one correspondence with the N photovoltaic strings 11 are further disposed in the inverter 12. After a boost circuit 121 connected to each photovoltaic string 11 performs boost processing on a direct current generated by the photovoltaic string 11, a direct current/alternating current (DC/AC) inverter module 122 in the inverter converts the direct current into an alternating current, and further transmits the alternating current to the grid 13. In addition, in some specific photovoltaic power generation systems, the inverter 12 shown in FIG. 1 and FIG. 2 may further be a photovoltaic maximum power point tracking (MPPT) module. The photovoltaic MPPT module may also be configured to: perform boost, and convert a direct current into an alternating current.

Figure 3:
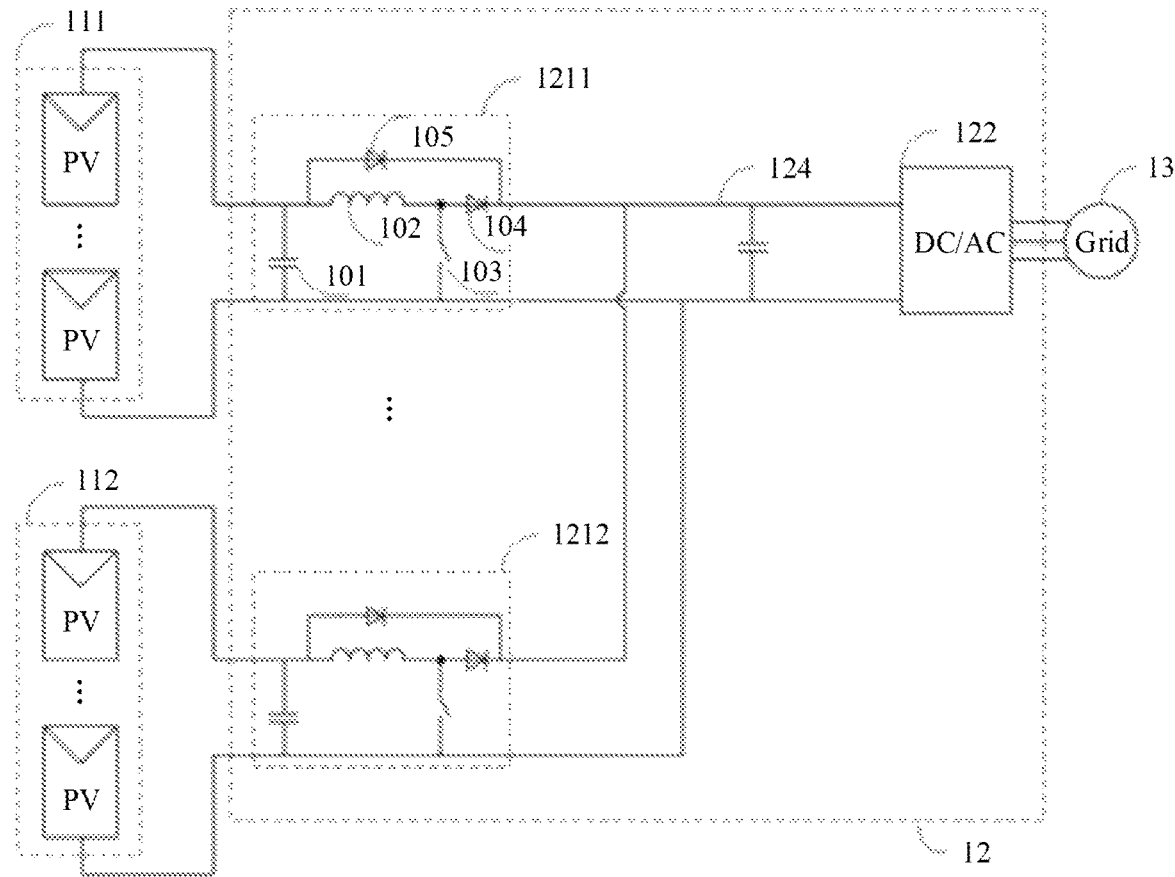
FIG. 3 is a schematic diagram of a circuit structure of an inverter.

More specifically, FIG. 3 is a schematic diagram of a circuit structure of an inverter. FIG. 3 shows a specific circuit structure of the boost circuit shown in FIG. 2. An example in which the boost circuit is a boost chopper circuit (BOOST chopper) is used to specifically describe a boost circuit 1211 in the inverter 12. The boost circuit 1211 includes a boost input capacitor 101, a boost inductor 102, a boost switching transistor 103, a boost diode 104, and a bypass diode 105. The boost circuit 1211 may control, through high-frequency on/off of the boost switching transistor 103 between an opened state and a closed state, the boost inductor 102 to be continuously switched between a charging state and a discharging state, to transmit energy by absorbing energy when the boost inductor 102 is charged and releasing energy when the boost inductor 102 is discharged, so that a voltage of an output side on the right of the boost circuit 1211 is higher than a voltage of an input side on the left of the boost circuit 1211. It should be noted that, on a basis of a basic circuit of the boost circuit shown in FIG. 3, another possible implementation of the boost circuit is not limited in this application.

In this case, based on the circuit structure shown in FIG. 3, each boost circuit has a unidirectionally conducted boost diode and a unidirectionally conducted bypass diode, so that each photovoltaic string can unidirectionally transmit electric energy to a common bus 124 by using a boost circuit connected to the photovoltaic string. Finally, the common bus 124 transmits electric energy of all the photovoltaic strings to the DC/AC inverter module 122. All the boost circuits are connected in parallel with the common bus 124. Therefore, in this case, a voltage of the common bus 124 is equal to a highest voltage in output voltages of all the boost circuits. An input voltage of a photovoltaic string connected to an input side on the left of a boost circuit with a low output voltage is less than the voltage of the bus connected to an output side on the right. If no boost diode is disposed in the boost circuit, due to a voltage difference between the input side and the output side of the boost circuit, a backflow current from the output side to the input side of the boost circuit is generated. When the backflow current flows into the photovoltaic string connected to the input side of the boost circuit, a photovoltaic module in the photovoltaic string is damaged, or even a fire is caused. Consequently, a serious safety accident is caused, and an economic loss is caused.

Figure 4:
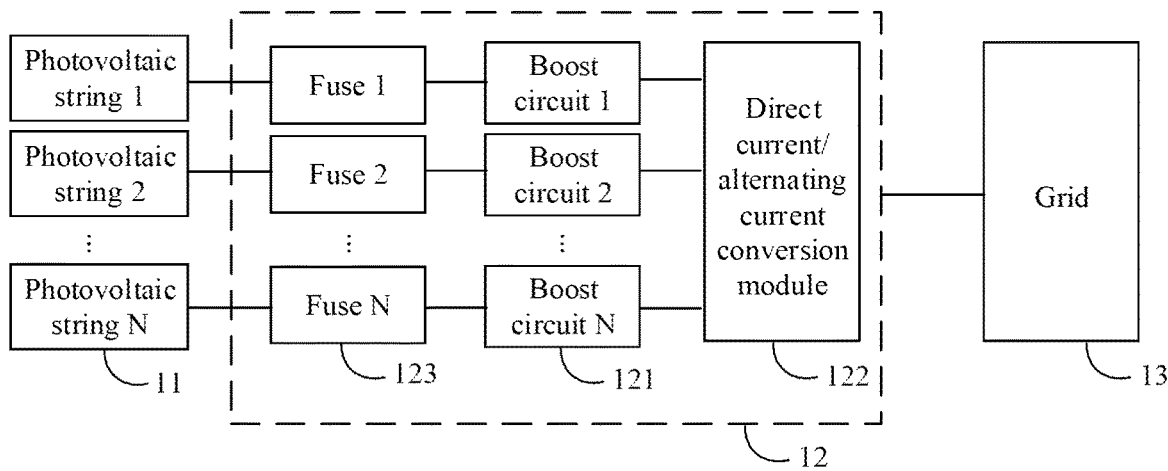
FIG. 4 is a schematic diagram of an internal structure of another inverter.

Therefore, when either the boost diode or the bypass diode in the boost circuit is short-circuited, damage is caused to the photovoltaic string connected to the boost circuit. To avoid a serious consequence caused when the diode is short-circuited, in another implementation of the inverter, when the inverter is connected to the photovoltaic string by using the boost circuit, a fuse with a specified current melting threshold is further additionally disposed between the boost circuit and the photovoltaic string, to protect the photovoltaic string when the diode is short-circuited. For example, FIG. 4 is a schematic diagram of an internal structure of another inverter. In the photovoltaic power generation system shown in FIG. 4, N fuses 123 that are in a one-to-one correspondence with the N photovoltaic strings 11 are further disposed in the inverter 12, and each of the N photovoltaic strings 11 is connected to the boost circuit 121 by using one fuse 123.

Figure 5:
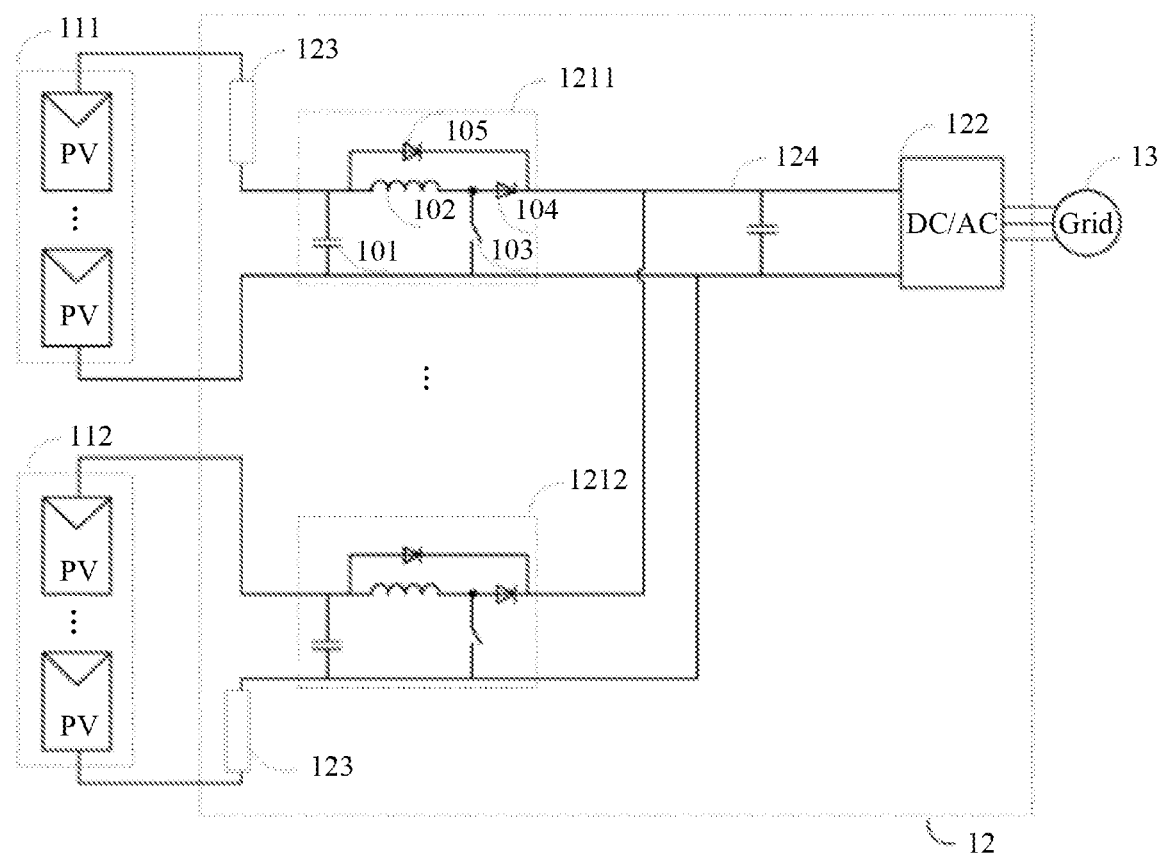
FIG. 5 is a schematic diagram of a circuit structure of another inverter.

More specifically, FIG. 5 is a schematic diagram of a circuit structure of another inverter. FIG. 5 shows a specific circuit structure of the boost circuit shown in FIG. 4. Any two photovoltaic strings 111 and 112 in the N photovoltaic strings 11 are used as an example. Positive and negative poles of the photovoltaic string 111 are respectively connected to positive and negative poles of a corresponding boost circuit 1211 in the inverter 12, and positive and negative poles of the photovoltaic string 112 are respectively connected to positive and negative poles of a corresponding boost circuit 1212 in the inverter 12. In this case, the fuse 123 may be disposed on a positive pole line shown by the photovoltaic string 111, and may also be disposed on a negative pole line shown by the photovoltaic string 112. After a fuse is connected between each photovoltaic string and boost circuit, when a diode in any boost circuit is short-circuited, if a backflow current flowing to a photovoltaic string is generated because a voltage of an output side of the boost circuit is greater than a voltage of an input side, and when the backflow current is greater than the melting threshold of the fuse, the fuse melts, and the backflow current is not input into the photovoltaic string, to protect the photovoltaic string.

However, in the inverter shown in FIG. 5, although the photovoltaic strings connected to all the boost circuits can be protected by disposing the fuses between the boost circuits and the photovoltaic strings to protect, in this solution, only when the fuse melts, it can be determined whether the diode in the boost circuit is short-circuited. Costs of disposing the fuse in the inverter are increased, and workload of maintaining the inverter and the fuse is increased.

Therefore, this application provides a method and an apparatus for detecting a short circuit of an inverter, and an inverter, to resolve a problem that a current flows back when a diode in a boost circuit in the inverter is short-circuited.

With reference to the accompanying drawings, the following describes the method and the apparatus for detecting a short circuit of an inverter, and the inverter provided in this application.

Figure 6:
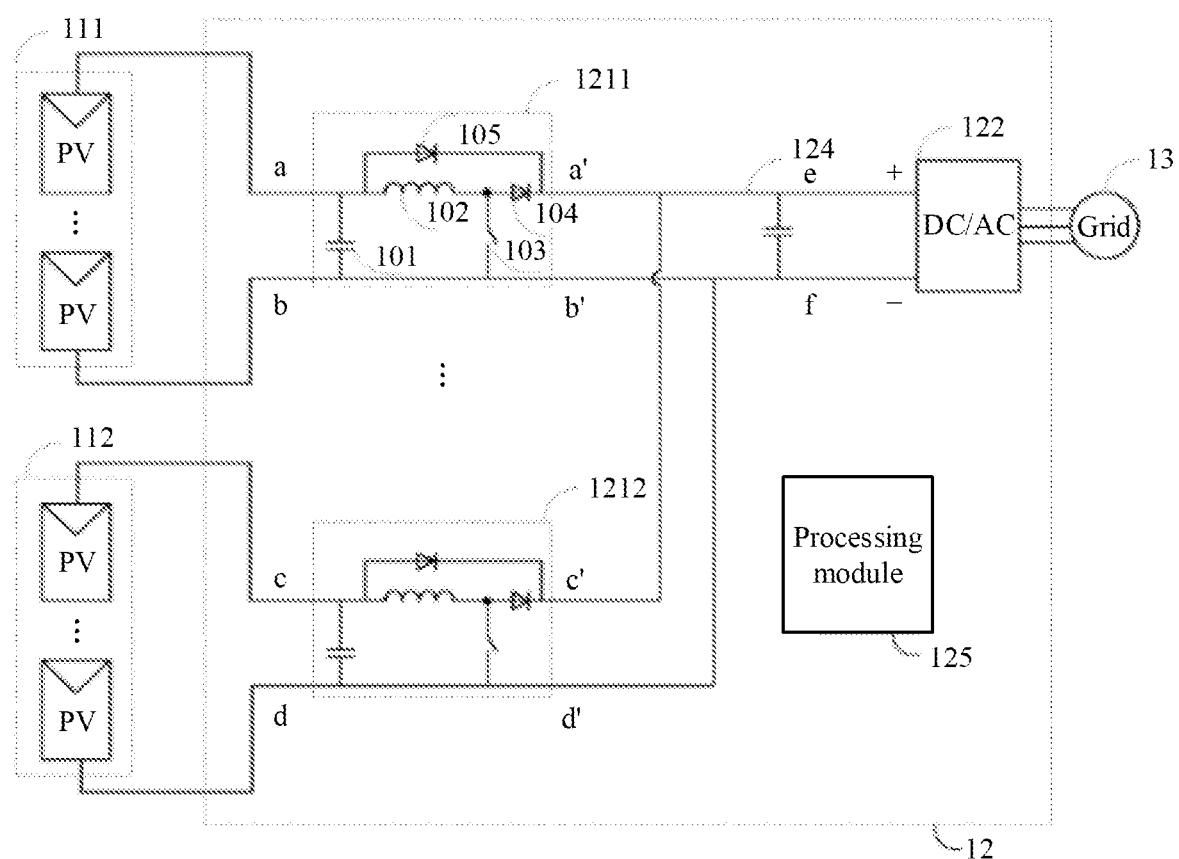
FIG. 6 is a schematic diagram of a structure of an embodiment of an inverter according to this application.

FIG. 6 is a schematic diagram of a structure of an embodiment of an inverter according to this application. The inverter provided in this embodiment may be applied to the photovoltaic power generation scenario shown in FIG. 1. Direct currents generated by a plurality of photovoltaic strings 11 may be further transmitted to a grid 13 after an inverter 12 performs boost and conversion processing on the direct currents. In the example shown in FIG. 6, that the inverter 12 is connected to a total of two photovoltaic strings, namely, a photovoltaic string 111 and a photovoltaic string 112 is used as an example for description, and the inverter 12 includes a plurality of boost circuits, a common bus 124, and a direct current/alternating current (DC/AC) inverter module 122. A quantity of boost circuits may be greater than or equal to a quantity of photovoltaic strings connected to the inverter. In this case, in the example shown in FIG. 6, the inverter 12 may be connected to the photovoltaic string 111 by using an input side of a boost circuit 1211 in the inverter 12, and connected to the photovoltaic string 112 by using an input side of a boost circuit 1212 in the inverter 12. In addition, an output side of each boost circuit is connected in parallel with the common bus 124. After performing boost processing on a direct current generated by the photovoltaic string 111 on the input side, the boost circuit 1211 may send, to the DC/AC inverter module 122 by using the common bus 124, the direct current on which boost processing is performed. After performing boost processing on a direct current generated by the photovoltaic string 112 on the input side, the boost circuit 1212 may send, to the DC/AC inverter module 122 by using the common bus 124, the direct current on which boost processing is performed. The DC/AC inverter module 122 converts the direct current into an alternating current, and then outputs the alternating current to the grid 13.

Further, in the example shown in FIG. 6, the boost circuit 1211 and the boost circuit 1212 each may be a boost circuit. Because the boost circuit 1211 is connected in parallel with the common bus 124, and the boost circuit 1212 is also connected in parallel with the common bus 124, a voltage of the common bus 124 is the same as a highest voltage of output sides of the boost circuit 1211 and the boost circuit 1212. For example, a voltage of the output side of the boost circuit 1211 is 1000 V, a voltage of the output side of the boost circuit 1212 is 1200 V, and the voltage of the common bus 124 is 1200 V. In this case, an input voltage of the photovoltaic string 111 connected to the input side on the left of the boost circuit 1211 is less than the voltage of the common bus 124 connected to the output side on the right, and a boost diode 104 and a bypass diode 105 that are disposed in the boost circuit 1211 may be used to prevent a backflow current, generated due to a voltage difference between the input side and the output side of the boost circuit 1211, from flowing into the photovoltaic string 111.

More specifically, in this embodiment, to prevent a diode in each boost circuit in the inverter from being short-circuited, a processing module 125 in the inverter 12 may be configured to detect whether the diode in each boost circuit in the inverter is short-circuited. A scenario in which a detected diode is short-circuited includes the following: A boost diode in the boost circuit is short-circuited, or a bypass diode in the boost circuit is short-circuited, or both a boost diode and a bypass diode in the boost circuit are short-circuited.

Optionally, the processing module 125 may be an apparatus that is disposed in the inverter 12 and that is specially configured to detect whether a diode is short-circuited, or the processing module 125 may be an existing apparatus or module in the inverter 12, for example, a central processing unit (CPU) or a hardware circuit. In addition, the processing module 125 may determine a circuit parameter by using a connection relationship between the processing module 125 and both each boost circuit and the common bus in the inverter. The connection relationship between the processing module 125 and both the boost circuit and the common bus is not shown in FIG. 6. For example, the processing module 125 may be connected to an input side a-b and an output side a'-b' of the boost circuit 1211. In this case, the processing module may determine a voltage of the input side and a voltage of the output side of the boost circuit 1211. Alternatively, the processing module 125 may be connected to a positive pole e and a negative pole f of the common bus 124, and determine a voltage between e and f of the common bus 124. In addition, in another possible implementation, the processing module 125 may be disposed outside the inverter 12, and is used as a module independent of the inverter 12.

Figure 7:
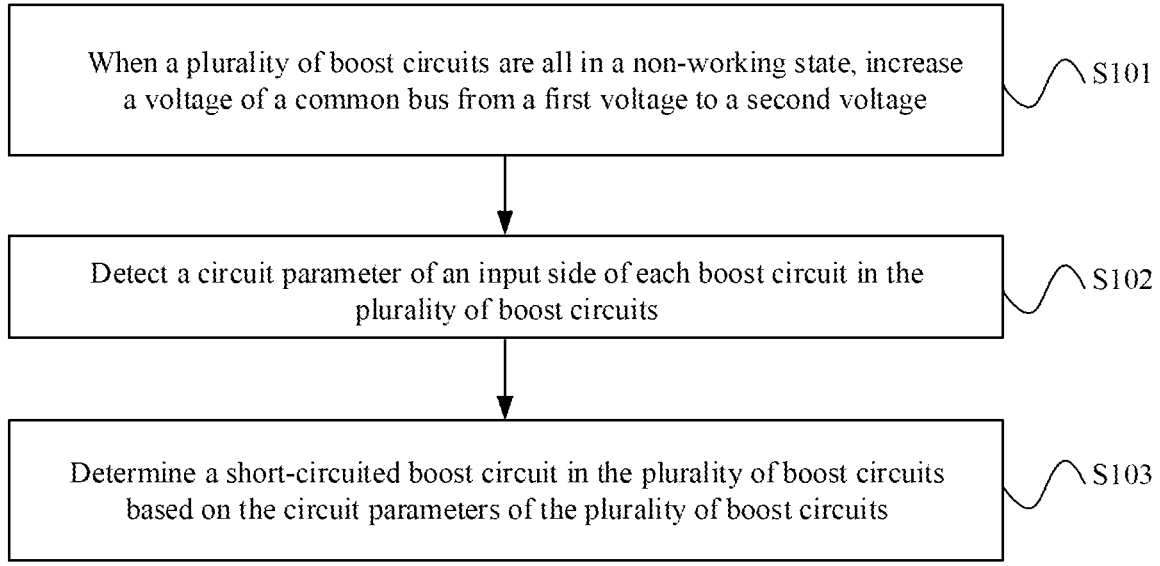
FIG. 7 is a schematic flowchart of an embodiment of a method for detecting a short circuit of an inverter according to this application.

FIG. 7 is a schematic flowchart of an embodiment of a method for detecting a short circuit of an inverter according to this application. The method for detecting a short circuit of an inverter shown in FIG. 7 may be performed by the processing module 125 shown in FIG. 6, and may be used to detect whether the diode in each boost circuit in FIG. 6 is short-circuited. The method includes the following steps:

S101. When the plurality of boost circuits are all in a non-working state, increase the voltage of the common bus from a first voltage to a second voltage.

S102. Detect a circuit parameter of an input side of each boost circuit in the plurality of boost circuits.

S103. Determine a short-circuited boost circuit in the plurality of boost circuits based on the circuit parameter.

Specifically, in this embodiment, when the processing module 125 in the inverter detects whether the diode in the boost circuit is short-circuited, all the boost circuits in the inverter need to be in a non-working state. The boost circuit includes at least a working state and a non-working state. The boost circuit 1211 is used as an example. When the boost circuit 1211 is in a working state, boost processing may be performed on a voltage $V_{ab}$ of the input side a-b, to obtain a voltage $V_{a'b'}$ of the output side a'-b'. In this case, $V_{ab}<V_{a'b'}$. When the boost circuit 1211 is in a non-working state, boost processing is not performed on a voltage $V_{ab}$ of the input side a-b. In this case, $V_{ab}=V_{a'b'}$.

Optionally, when all the boost circuits in the inverter are in a non-working state, the processing module 125 may actively perform the method for detecting a short circuit of an inverter shown in FIG. 7, to detect whether the diode in each boost circuit is short-circuited. Alternatively, when the processing module 125 performs detection, if some or all of the boost circuits in the inverter are still in a working state, the processing module 125 first switches all the boost circuits in the inverters to a non-working state, and then performs S101 shown in FIG. 7.

In this case, when the plurality of boost circuits in the inverter are all in a non-working state, because each boost circuit is connected in parallel with the common bus in the inverter, the voltage of the common bus is equal to a highest voltage of output sides of all the boost circuits in the inverter, and is denoted as the first voltage in this embodiment. In S101, the processing module 125 increases, to the second voltage, the first voltage that is of the common bus and that exists when all the boost circuits are in a non-working state. The second voltage is greater than the first voltage, so that the second voltage of the common bus is higher than the first voltage of the output sides of all the boost circuits.

In this case, all the boost circuits are connected in parallel with the common bus 124, and all the boost circuits in the inverter 12 are in a non-working state. After the processing module 125 increases the voltage of the common bus 124 to the second voltage, voltages of the output sides on the right of all the boost circuit are equal to the second voltage. Therefore, the voltages of the output sides of all the boost circuits in the inverter 12 are greater than the voltages of the input sides of the boost circuits, including a boost circuit corresponding to the first voltage that is the highest voltage of the output sides before the boost.

In this case, for each boost circuit, the boost circuit 1211 in FIG. 6 is used as an example. If the boost diode 104 and the bypass diode 105 in the boost circuit 1211 are not short-circuited, the voltage $V_{a'b'}$ of the output side a'-b' of the boost circuit 1211 should be greater than the voltage $V_{ab}$ of the input side a-b, a positive pole current direction of the input side is a-a', and a negative pole current direction of the input side is b'-b. However, if either or both of the boost diode 104 and the bypass diode 105 in the boost circuit 1211 are short-circuited, at least the following two cases occur: 1. The voltage $V_{ab}$ of the input side a-b on the left of the boost circuit 1211 is equal to the voltage $V_{a'b'}$ of the output side a'-b' on the right. 2. A positive pole current direction of the input side of the boost circuit 1211 is a'-a, and a negative pole current direction of the input side is b-b'. Because a current direction existing after the short circuit is opposite to a current direction existing when the diode is not short-circuited, the current may also be referred to as a "backflow current". Therefore, the processing module 125 may determine, by using a voltage or a current of the input side of each boost circuit, whether the diode in each boost circuit is short-circuited.

In a specific implementation of the embodiment shown in FIG. 7, the processing module 125 may determine, by detecting the voltage of the input side of the boost circuit, whether the boost circuit is short-circuited. After increasing the voltage of the bus from the first voltage to the second voltage by using S101, the processing module 125 further detects the voltage of the input side of each boost circuit in the inverter 12 in S102. The boost circuit 1211 in FIG. 6 is used as an example. The processing module 125 may be connected to a positive pole a and a negative pole b on the input side of the boost circuit 1211, and detect the voltage $V_{ab}$ between a and b by using a connection relationship. In this case, when detecting that the voltage $V_{ab}$ of the input side of the boost circuit 1211 is less than the second voltage, the processing module 125 determines that the boost diode 104 and the bypass diode 105 in the boost circuit 1211 are not short-circuited. When detecting that the voltage of the input side of the boost circuit 1211 is equal to the second voltage, the processing module 125 determines that the boost diode 104 and/or the bypass diode 105 in the boost circuit 1211 are/is short-circuited. Then, the processing module 125 detects, based on the foregoing method for detecting the boost circuit 1211, whether all the boost circuits in the inverter 12 are short-circuited, and finally determines, by using S103, that a diode in a boost circuit whose input side has a voltage equal to the second voltage in the inverter is short-circuited. In addition, the processing module 125 performs boost processing on the common bus, and the voltage of the common bus is greater than the voltages of the input sides of all the boost circuits. Therefore, the processing module 125 may detect whether all the boost circuits are short-circuited.

In another specific implementation of the embodiment shown in FIG. 7, the processing module 125 may determine, by detecting the current of the input side of the boost circuit, whether the diode in the boost circuit is short-circuited. After increasing the voltage of the bus from the first voltage to the second voltage by using S101, the processing module 125 further detects the current of the input side of each boost circuit in the inverter 12 in S102. The boost circuit 1211 in FIG. 6 is also used as an example. The processing module 125 may be connected to a positive pole a or a negative pole b on the input side of the boost circuit 1211, and detect a current direction at the point a or b by using a connection relationship. When detecting that a positive pole current direction on the input side of the boost circuit 1211 is a-a' or a negative pole current direction on the input side is b'-b, the processing module 125 determines that the boost diode 104 and the bypass diode 105 in the boost circuit 1211 are not short-circuited. When detecting that a positive pole current direction on the input side of the boost circuit 1211 is a'-a or a negative pole current direction on the input side is b-b', the processing module 125 determines that the boost diode 104 and/or the bypass diode 105 in the boost circuit 1211 are/is short-circuited. Then, the processing module 125 detects, based on the foregoing method for detecting the boost circuit 1211, whether all the boost circuits in the inverter 12 are short-circuited, and finally determines, by using S103, that a diode in a boost circuit whose input side has a backflow current in the inverter is short-circuited. In addition, the processing module 125 performs boost processing on the common bus, the voltage of the common bus is greater than the voltages of the input sides of all the boost circuits, and all short-circuited boost circuit have voltage differences and backflow currents may be generated. Therefore, the processing module 125 may detect whether all the boost circuits are short-circuited.

Optionally, the processing module 125 may perform detection in one or a combination of the foregoing two specific implementations of this embodiment. For example, the processing module 125 may determine, by detecting that a voltage of an input side of a boost circuit is equal to the second voltage, that the boost circuit is short-circuited, or may determine, by detecting that an input side of a boost circuit has a backflow current, that the boost circuit is short-circuited, or may determine, when determining that an input side of a boost circuit has a voltage equal to the second voltage and has a backflow current, that the boost circuit is short-circuited.

Optionally, after determining that the boost circuit in which the diode is short-circuited exists in the inverter, the processing module 125 may send prompt information, to indicate a short circuit in the inverter to maintenance personnel of the inverter, and indicate a specific short-circuited boost circuit. For example, the prompt information may be displayed by using a display screen, played by using a speaker, or the like. It may be understood that, in this embodiment, the processing module 125 may detect that none of the plurality of boost circuits is short-circuited, and send no prompt information.

In conclusion, in the method for detecting a short circuit of an inverter provided in this embodiment, the processing module increases the voltage of the common bus when the plurality of boost circuits in the inverter are all in a non-working state, then detects the circuit parameters of the input sides of all the plurality of boost circuits, and further determines the boost circuit in which the diode is short-circuited in the plurality of boost circuits based on the circuit parameters of the input sides of the boost circuits. Compared with a manner of disposing a fuse to detect whether a boost circuit is short-circuited in a conventional technology shown in FIG. 5, because no additional fuse needs to be disposed in the inverter, circuit complexity of the inverter can be reduced, and circuit complexity of a photovoltaic power generation system including the inverter is reduced.

In addition, in this embodiment, the processing module can controllably increase the voltage of the bus from the first voltage to the second voltage, and the second voltage only needs to be slightly higher than the first voltage. In this way, even if the diode in the boost circuit is short-circuited, the second voltage of the bus does not cause an excessively large backflow current. Therefore, in a process of detecting whether the diode in the boost circuit is short-circuited, protection of the photovoltaic module connected to the boost circuit can be further ensured. Compared with the conventional technology in which the fuse melts by passively waiting for the voltage of the bus to be uncontrollably increased, protection of the photovoltaic module is improved, and it is further ensured that a serious consequence is not caused because the photovoltaic module is damaged by the backflow current.

Figure 8:
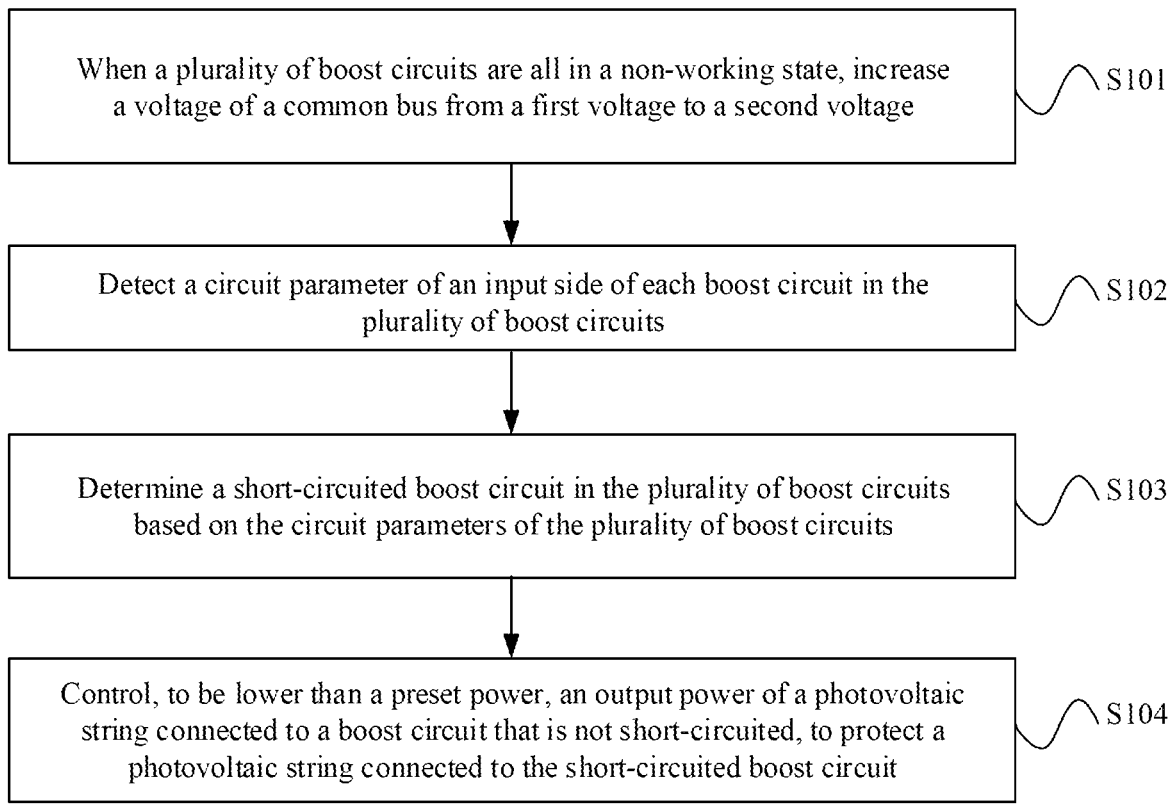
FIG. 8 is a schematic flowchart of another embodiment of a method for detecting a short circuit of an inverter according to this application.

Further, on a basis of the embodiment shown in FIG. 7, FIG. 8 is a schematic flowchart of another embodiment of a method for detecting a short circuit of an inverter according to this application. As shown in FIG. 8, after the processing module 125 determines the short-circuited boost circuit in the plurality of boost circuits by using S103, the method further includes S104 of controlling, to be lower than a preset power, an output power of a photovoltaic string connected to a boost circuit that is not short-circuited, to protect a photovoltaic string connected to the short-circuited boost circuit.

Specifically, in this embodiment, when the processing module 125 determines, by using the foregoing embodiment, that there is a short circuit in the plurality of boost circuits, due to a characteristic that the boost circuit can further reduce the voltage of the output side thereof, if the processing module 125 detects the short-circuited boost circuit in the plurality of boost circuits, another boost circuit that is not short-circuited in the plurality of boost circuits may be enabled. In this way, after the another boost circuit that is not short-circuited is switched to a working state, a voltage of an output side is reduced by using the boost circuit that is not short-circuited, to reduce an output power of the photovoltaic string connected to the short-circuited boost circuit. When the short-circuited boost circuit does not work, a voltage of an output side of the boost circuit may be denoted as a third voltage. In this case, after the boost circuit that is not short-circuited is switched to a working state, the voltage of the output side of the boost circuit that is not short-circuited may be less than the third voltage, so that a power of the output side of the boost circuit that is not short-circuited is reduced. It may be understood that reducing a voltage of an output side of a boost circuit is also equivalent to reducing a voltage of an input side of the boost circuit and reducing a voltage of an output side of a photovoltaic string. Then, after output powers of all boost circuits that are not short-circuited in the plurality of boost circuits are reduced, a voltage of the photovoltaic string connected to the short-circuited boost circuit can also be reduced. Therefore, a voltage of an input side of the short-circuited boost circuit is reduced by reducing the output power of the photovoltaic string connected to the boost circuit that is not short-circuited, to protect the photovoltaic string connected to the short-circuited boost circuit.

For example, in the circuit shown in FIG. 6, when it is detected that the diode in the boost circuit 1211 is short-circuited, the boost circuit 1211 has failed. In this case, the processing module 125 may switch the boost circuit 1212 to a working state, and reduce an output voltage of an output side c'-d' by using the boost circuit 1212, to reduce power of the input side of the boost circuit 1211, that is, reduce an output power of a photovoltaic string 111, so as to protect the photovoltaic string 111 connected to the short-circuited boost circuit 1211.

In conclusion, in the method for detecting a short circuit of an inverter provided in this embodiment, after detecting the short-circuited boost circuit in the plurality of boost circuits, the processing module 125 can further reduce the voltage of the bus by enabling the boost circuit that is not short-circuited, to reduce the output power of the photovoltaic string connected to the short-circuited boost circuit, and protect the photovoltaic string connected to the short-circuited boost circuit. Therefore, the photovoltaic string can be automatically protected after the boost circuit is short-circuited, so that measures are taken before operation and maintenance personnel find and process the short-circuited boost circuit, to ensure that the photovoltaic string is not damaged. This further improves safety performance of the photovoltaic power generation system.

On a basis of the foregoing embodiments, this application further provides the following specific implementations, to implement S101 of increasing the voltage of the common bus from a first voltage to a second voltage. The following is described with reference to the accompanying drawings.

In a first possible implementation, when the plurality of boost circuits are all in a non-working state, the processing module 125 may determine a boost circuit whose input side has a lowest voltage. Because the voltage of the common bus is equal to the highest voltage of the output sides of the plurality of boost circuits, it may be considered that a diode in the boost circuit whose input side has a lowest voltage is not short-circuited. Therefore, after the processing module 125 switches, to a working state, the boost circuit whose input side has a lowest voltage, the boost circuit performs boost processing on a direct current of a photovoltaic string on the input side, and then inputs the direct current to the common bus, to increase the voltage of the common bus.

Figure 9:
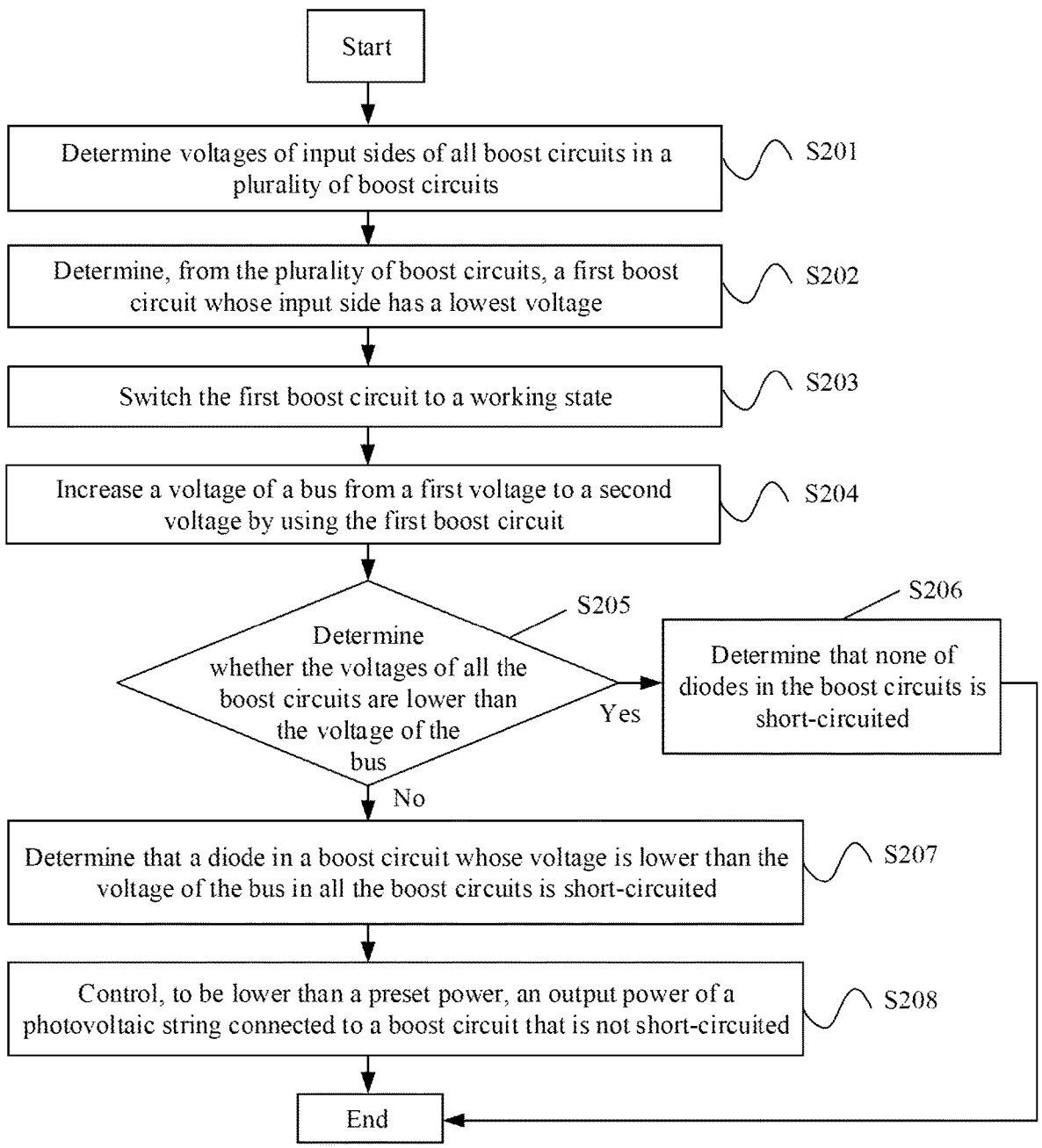
FIG. 9 is a schematic flowchart of an embodiment of increasing a voltage of a bus according to this application.

More specifically, FIG. 9 is a schematic flowchart of an embodiment of increasing a voltage of a bus according to this application. FIG. 9 is a complete schematic flowchart in which the processing module 125 in the inverter shown in FIG. 6 increases the voltage of the bus in the foregoing implementation. The method includes the following steps.

S201. The processing module 125 determines voltages of input sides of all boost circuits in the plurality of boost circuits. Specifically, when the plurality of boost circuits are all in a non-working state, the processing module 125 needs to first determine the voltages of the input sides of all the boost circuits in the plurality of boost circuits by using S201. For example, the processing module 125 may determine that the voltage of the input side of the boost circuit 1211 is 1400 V, the voltage of the input side of the boost circuit 1212 is 1200 V, and the voltage of the common bus 124 is 1400 V.

S202. The processing module 125 determines, from the plurality of boost circuits in S201, a first boost circuit whose input side has a lowest voltage. Specifically, the processing module 125 may determine that the voltages of the input side and the output side of the boost circuit 1212 whose input side has a lowest voltage are different, where a diode in the boost circuit 1212 is not short-circuited, and determine, in S202, that the boost circuit 1212 is the first boost circuit.

S203. The processing module 125 switches the boost circuit 1212 to a working state.

S204. The boost circuit 1212 increases a voltage of the received direct current of the photovoltaic string 112 from 1200 V to a value greater than 1400 V, for example, increases the voltage to 1450 V. In this case, the voltage of the common bus 124 is also 1450 V, to boost the common bus 124. It should be noted that a general boost circuit significantly increases a voltage. In S204, the boost circuit 1212 only needs to work at a small duty cycle to increase the voltage of the direct current generated by the photovoltaic string. Therefore, a duty cycle at which the boost circuit 1212 can work may be adjusted based on the voltage of the common bus, provided that the voltage of the output side of the boost circuit 1212 is greater than the voltage of the common bus in S201.

S205. The processing module 125 determines whether the voltages of the input sides of all the boost circuits are lower than the voltage of the bus. The voltage of the bus is the second voltage obtained after an increase.

S206. If the voltages of the input sides of all the boost circuits are lower than the second voltage obtained after an increase, it indicates that none of diodes in the boost circuits is short-circuited, and the procedure may end.

S207. If there is a boost circuit, in all the boost circuits, whose input side has a voltage equal to the second voltage obtained after an increase, determine that a diode in the boost circuit whose input side has a voltage equal to the second voltage obtained after an increase is short-circuited.

S208. After determining the short-circuited boost circuit, the processing module 125 further controls, to be lower than a preset power, an output power of a photovoltaic string connected to a boost circuit that is not short-circuited, to protect a photovoltaic string connected to the short-circuited boost circuit. Finally, the procedure ends.

In a second possible implementation, when the plurality of boost circuits are all in a non-working state, the processing module 125 may randomly determine a boost circuit from the plurality of boost circuits, so that the boost circuit performs boost processing on a direct current of a photovoltaic string on an input side based on a low duty cycle, and then inputs the direct current to the common bus, to increase the voltage of the common bus.

Figure 10:
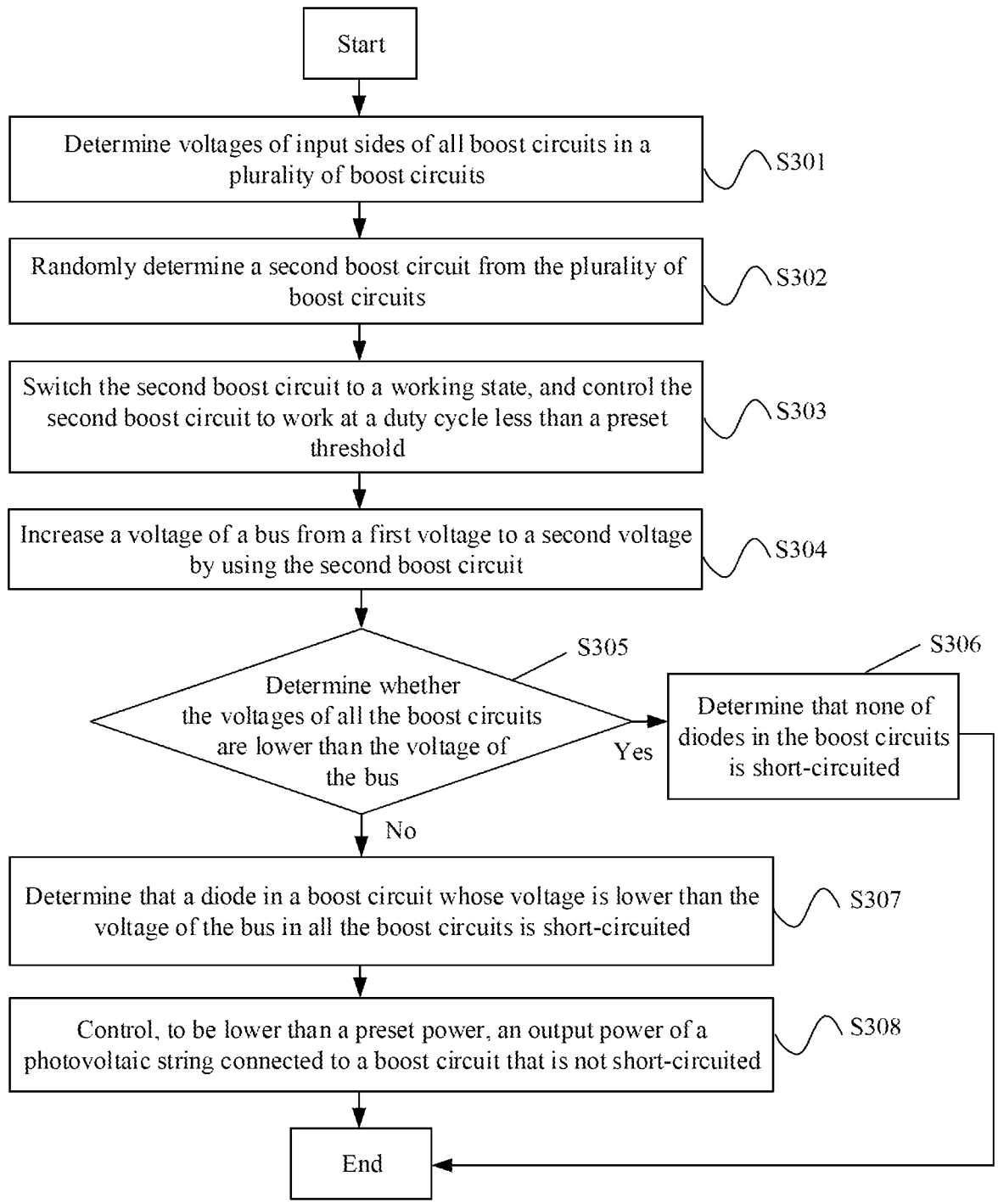
FIG. 10 is a schematic flowchart of another embodiment of increasing a voltage of a bus according to this application.

More specifically, FIG. 10 is a schematic flowchart of another embodiment of increasing a voltage of a bus according to this application. FIG. 10 is a complete schematic flowchart in which the processing module 125 in the inverter shown in FIG. 6 increases the voltage of the bus in the foregoing implementation. The method includes the following steps.

S301. The processing module 125 determines voltages of input sides of all boost circuits in the plurality of boost circuits. Specifically, when the plurality of boost circuits are all in a non-working state, the processing module 125 needs to first determine the voltages of the input sides of all the boost circuits in the plurality of boost circuits by using S301. For example, the processing module 125 may determine that the voltage of the input side of the boost circuit 1211 is 1000

V, the voltage of the input side of the boost circuit 1212 is 1000 V, and the voltage of the common bus 124 is 1000 V.

S302. The processing module 125 randomly determines a boost circuit from the plurality of boost circuits determined in S301, where the boost circuit is denoted as a second boost circuit. This embodiment may be applied to a case in which the voltages of the input sides of all the boost circuits are the same. In this case, a second boost circuit is randomly determined from the plurality of boost circuits.

S303. The processing module 125 switches, to a working state, the second boost circuit determined in S302.

S304. The second boost circuit increases a voltage of a received direct current of a photovoltaic string from the first voltage to the second voltage, for example, increases the voltage to 1050 V. In this case, the voltage of the common bus 124 is also increased from 1000 V to 1050 V, to boost the common bus 124. It should be noted that a general boost circuit significantly increases a voltage. In S304, the second boost circuit only needs to work at a very small preset duty cycle to increase the voltage of the direct current generated by the photovoltaic string. Therefore, a duty cycle at which the second boost circuit can work may be adjusted based on the voltage of the common bus, provided that a voltage of an output side of the second boost circuit is greater than the voltage of the common bus in S301.

S305. The processing module 125 determines whether the voltages of the input sides of all the boost circuits are lower than the voltage of the bus. The voltage of the bus is the second voltage obtained after an increase.

S306. If the voltages of the input sides of all the boost circuits are lower than the second voltage obtained after an increase, it indicates that none of diodes in the boost circuits is short-circuited, and the procedure may end.

S307. If there is a boost circuit, in all the boost circuits, whose input side has a voltage equal to the second voltage obtained after an increase, determine that a diode in the boost circuit whose input side has a voltage equal to the second voltage obtained after an increase is short-circuited.

S308. After determining the short-circuited boost circuit, the processing module 125 further controls, to be lower than a preset power, an output power of a photovoltaic string of a boost circuit that is not short-circuited, to protect a photovoltaic string connected to the short-circuited boost circuit. Finally, the procedure ends.

Figure 11:
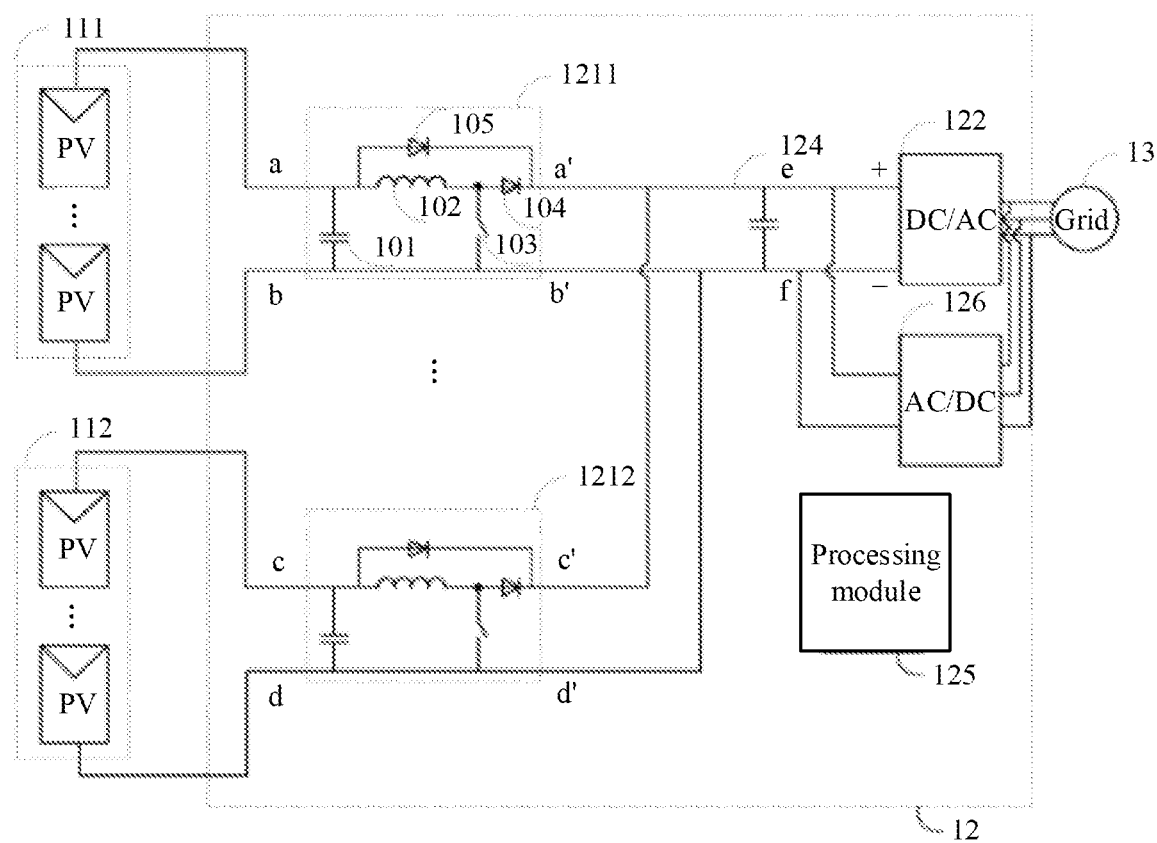
FIG. 11 is a schematic diagram of a structure of another embodiment of an inverter according to this application.

In a third possible implementation, in the photovoltaic power generation system, the inverter is further connected to the grid by using the DC/AC module. Therefore, to increase the voltage of the common bus connected to one side of the DC/AC module, power may be obtained from the grid connected to the other side of the DC/AC module. An alternating current in the grid is converted into a direct current, and then the direct current is input into the common bus, to increase the voltage of the common bus. To implement the foregoing boost manner, an alternating current/direct current (AC/DC) rectifier module further needs to be disposed in the inverter. Specifically, FIG. 11 is a schematic diagram of a structure of another embodiment of an inverter according to this application. On a basis of FIG. 6, the inverter shown in FIG. 11 further includes an AC/DC module 126. An input side of the AC/DC module 126 is connected to the grid 13, and an output side of the AC/DC module 126 is connected to the common bus 124.

Figure 12:
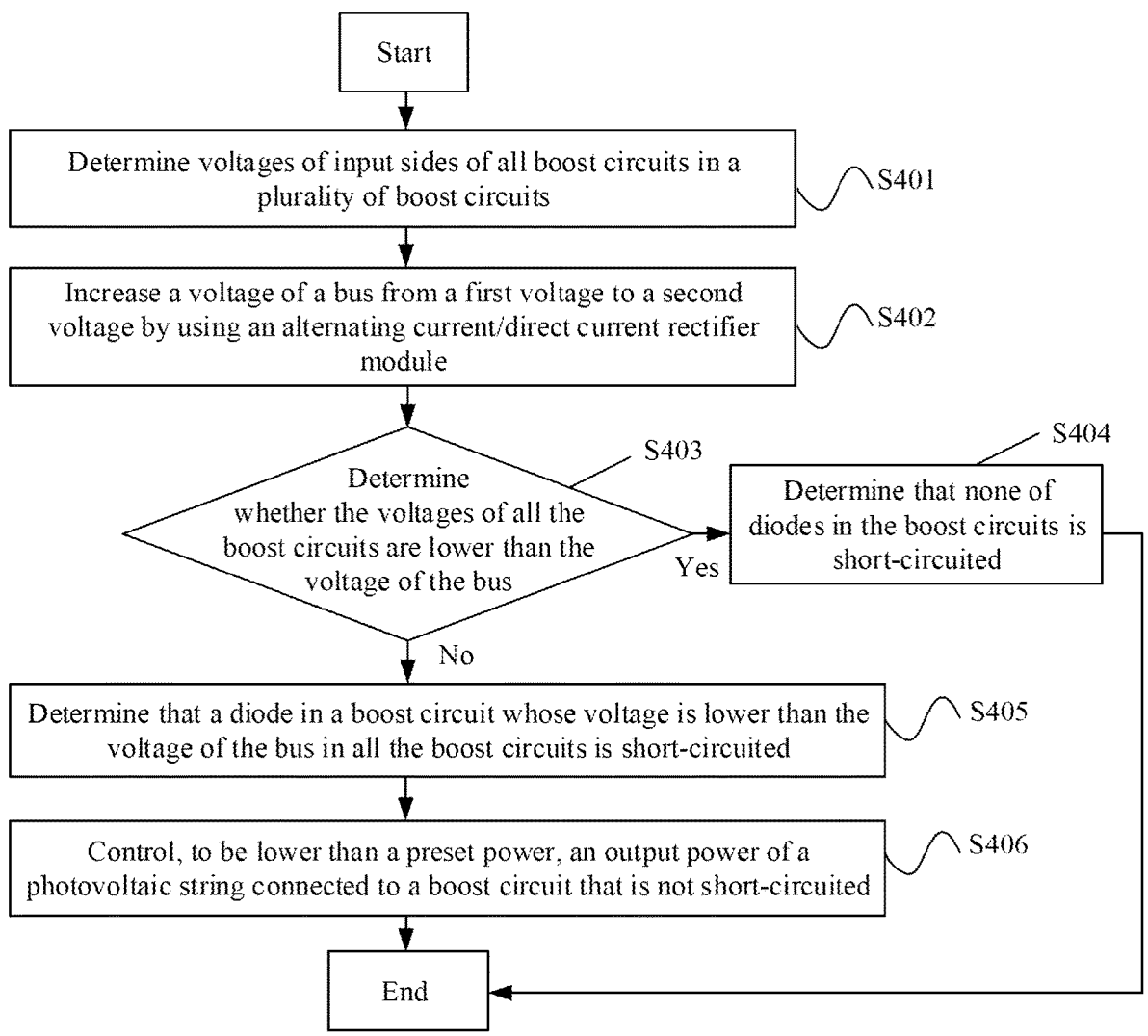
FIG. 12 is a schematic flowchart of still another embodiment of increasing a voltage of a bus according to this application.

More specifically, FIG. 12 is a schematic flowchart of still another embodiment of increasing a voltage of a bus according to this application. FIG. 12 is a complete schematic flowchart in which the processing module 125 in the inverter shown in FIG. 11 increases the voltage of the bus in the foregoing implementation. The method includes the following steps.

S401. The processing module 125 determines voltages of input sides of all boost circuits in the plurality of boost circuits. Specifically, when the plurality of boost circuits are all in a non-working state, the processing module 125 needs to first determine the voltages of the input sides of all the boost circuits in the plurality of boost circuits by using S401. For example, the processing module 125 may determine that the voltage of the input side of the boost circuit 1211 is 1400 V, the voltage of the input side of the boost circuit 1212 is 1200 V, and the voltage of the common bus 124 is 1400 V.

S402. After converting an alternating current in the grid 13 into a direct current by using the AC/DC module 126, the processing module 125 inputs the direct current into the common bus 124, to increase the voltage of the common bus 124, for example, increase the voltage from 1400 V to 1450 V, so as to boost the common bus 124.

S403. The processing module 125 determines whether the voltages of the input sides of all the boost circuits are lower than the voltage of the bus. The voltage of the bus is the second voltage obtained after an increase.

S404. If the voltages of the input sides of all the boost circuits are lower than the second voltage obtained after an increase, it indicates that none of diodes in the boost circuits is short-circuited, and the procedure may end.

S405. If there is a boost circuit, in all the boost circuits, whose input side has a voltage equal to the second voltage obtained after an increase, determine that a diode in the boost circuit whose input side has a voltage equal to the second voltage obtained after an increase is short-circuited.

S406. After determining the short-circuited boost circuit, the processing module 125 further controls, to be lower than a preset power, an output power of a photovoltaic string of a boost circuit that is not short-circuited, to protect a photovoltaic string connected to the short-circuited boost circuit. Finally, the procedure ends.

Figure 13:
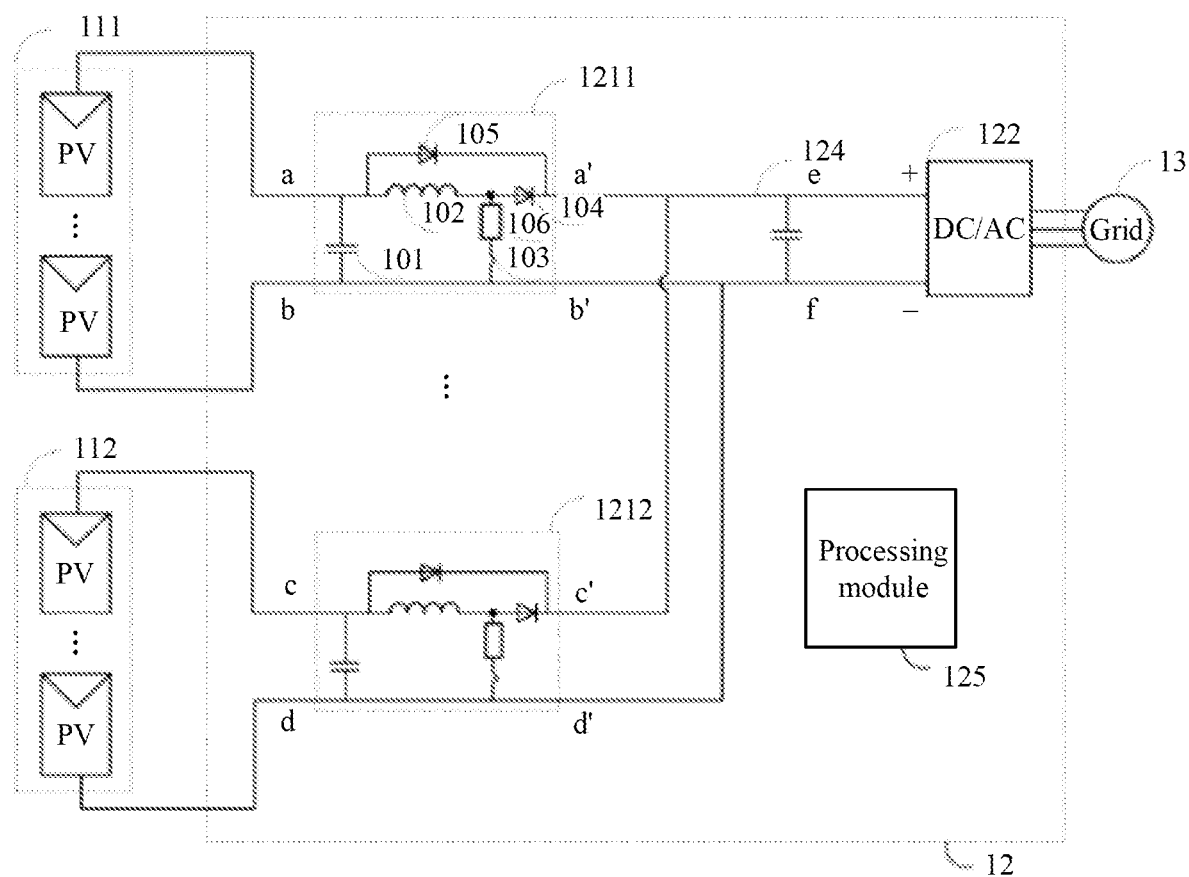
FIG. 13 is a schematic diagram of a structure of still another embodiment of an inverter according to this application.

Further, this application further provides a method for detecting a short circuit of an inverter. The method may be applied to an inverter shown in FIG. 13. FIG. 13 is a schematic diagram of a structure of still another embodiment of an inverter according to this application. On a basis of FIG. 6, each boost circuit in the inverter shown in FIG. 13 includes an overcurrent protector 106 connected in series with a boost switching transistor 103. The overcurrent protector 106 is configured to be disconnected when a current flowing through the boost switching transistor 103 is excessively large, to perform overcurrent protection. The overcurrent protector 106 may be a current transformer.

Figure 14:
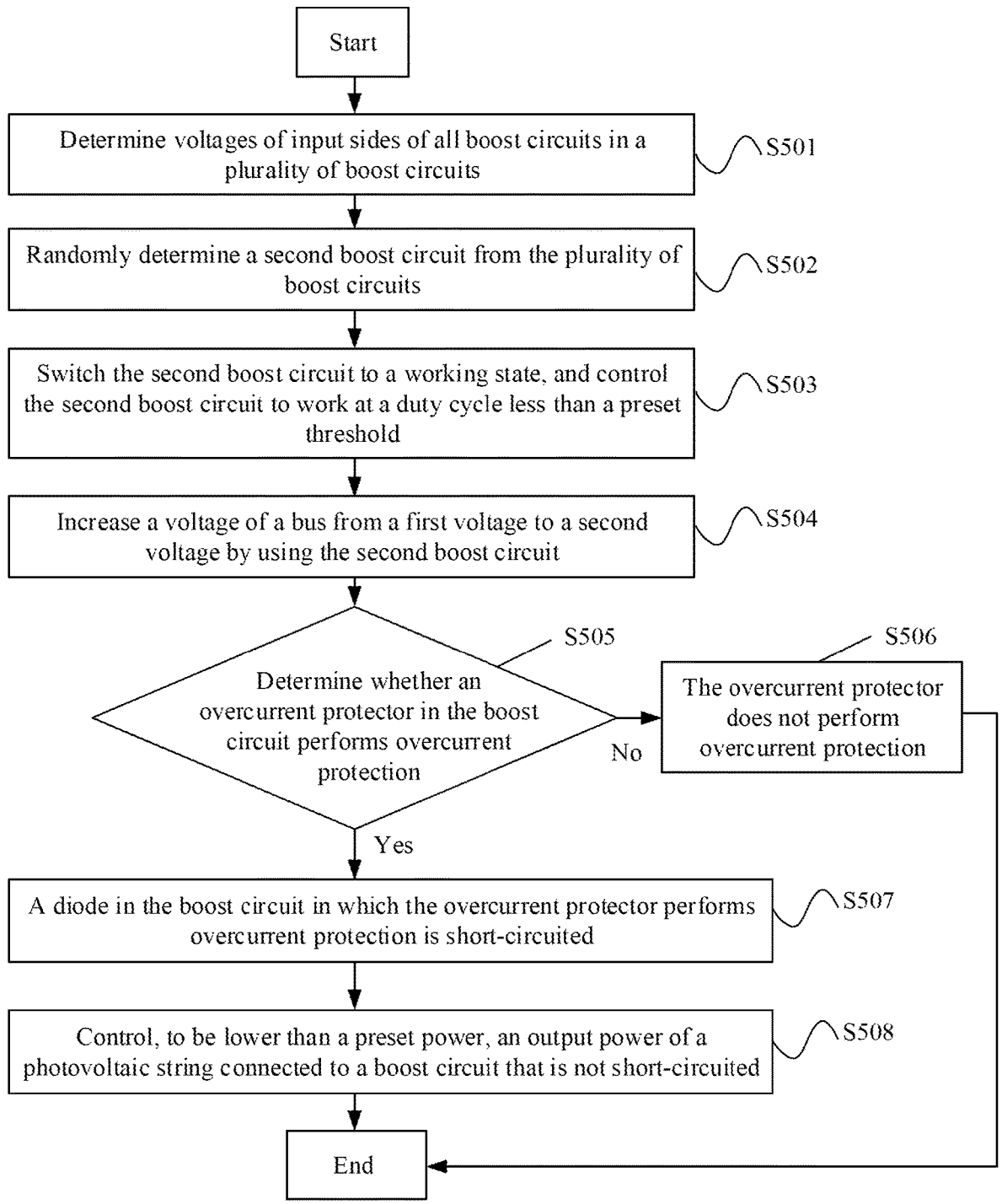
FIG. 14 is a schematic flowchart of still another embodiment of a method for detecting a short circuit of an inverter according to this application.

More specifically, FIG. 14 is a schematic flowchart of still another embodiment of a method for detecting a short circuit of an inverter according to this application. FIG. 14 shows a procedure in which the processing module 125 in the inverter shown in FIG. 13 detects, in the foregoing implementation, whether a plurality of boost circuits are short-circuited. The method includes the following steps.

S501. The processing module 125 determines voltages of input sides of all boost circuits in the plurality of boost circuits. Specifically, when the plurality of boost circuits are all in a non-working state, the processing module 125 needs to first determine the voltages of the input sides of all the boost circuits in the plurality of boost circuits by using S501. For example, the processing module 125 may determine that the voltage of the input side of the boost circuit 1211 is 1000 V, the voltage of the input side of the boost circuit 1212 is 1000 V, and the voltage of the common bus 124 is 1000 V.

S502. The processing module 125 randomly determines a boost circuit from the plurality of boost circuits determined in S501, where the boost circuit is denoted as a third boost circuit. This embodiment may be applied to a case in which the voltages of the input sides of all the boost circuits are the same. In this case, a third boost circuit is randomly determined from the plurality of boost circuits.

S503. The processing module 125 switches, to a working state, the third boost circuit determined in S502.

S504. The third boost circuit increases a voltage of a received direct current of a photovoltaic string from the first voltage to the second voltage, for example, increases the voltage to 1050 V. In this case, the voltage of the common bus 124 is also increased from 1000 V to 1050 V, to boost the common bus 124.

S505. The processing module 125 determines whether an overcurrent protector in the third boost circuit performs protection. The boost circuit 1211 is used as an example. When a current flowing through the boost switching transistor 103 is greater than a preset threshold, it indicates that the diode in the boost circuit 1211 is short-circuited. In this case, the overcurrent protector 106 turns off a drive of the boost switching transistor 103, to protect the boost switching transistor 103.

S506. If it is determined that the overcurrent protector in the third boost circuit does not perform overcurrent protection, it indicates that a diode in the third boost circuit is not short-circuited, and the procedure may end.

S507. If it is determined that the overcurrent protector in the third boost circuit performs overcurrent protection, it indicates that a diode in the third boost circuit is short-circuited.

Then, after detection is separately performed by sequentially using the plurality of boost circuits in the inverter as the foregoing third boost circuit by using steps S502 to S505, all short-circuited boost circuits in the plurality of boost circuits may be finally determined.

S508. After determining all the short-circuited boost circuits in the plurality of boost circuits, the processing module 125 further controls, to be lower than a preset power, an output power of a photovoltaic string of a boost circuit that is not short-circuited, to protect a photovoltaic string connected to the short-circuited boost circuit. Finally, the procedure ends.

In the foregoing embodiments provided in this application, the method for detecting a short circuit of an inverter provided in embodiments of this application is described from a perspective of the processor in the inverter. To implement functions in the foregoing methods provided in embodiments of this application, the processor used as an execution body may further include a hardware structure and/or a software module, and implement the foregoing functions in a form of the hardware structure, the software module, or the hardware structure plus the software module. Whether a function in the foregoing functions is performed by the hardware structure, the software module, or the combination of the hardware structure and the software module depends on particular applications and design constraints of the technical solutions.

Figure 15:
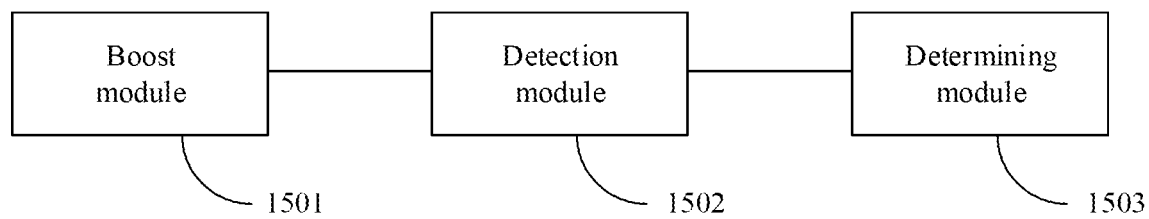
FIG. 15 is a schematic diagram of a structure of an embodiment of an apparatus for detecting a short circuit of an inverter according to this application.

For example, FIG. 15 is a schematic diagram of a structure of an embodiment of an inverter detection apparatus according to this application. The apparatus shown in FIG. 15 may be configured to perform the method described in any one of FIG. 7 to FIG. 10 and FIG. 12, and is configured to detect whether an inverter is short-circuited. The apparatus includes a boost module 1501, a detection module 1502, and a determining module 1503. The boost module 1501 is configured to: when a plurality of boost circuits are all in a non-working state, increase a voltage of a common bus from a first voltage to a second voltage. The first voltage is equal to a highest voltage in voltages of input sides of the plurality of boost circuits. The detection module 1502 is configured to detect a circuit parameter of the input side of each boost circuit in the plurality of boost circuits. The determining module 1503 is configured to determine a short-circuited boost circuit in the plurality of boost circuits based on the circuit parameters of the plurality of boost circuits.

Optionally, if the circuit parameter is a voltage, the determining module 1503 is specifically configured to determine, based on voltages of the plurality of boost circuits, that a boost circuit whose input side has a voltage equal to the second voltage in the plurality of boost circuits is short-circuited.

Optionally, if the circuit parameter is a current, the determining module 1503 is specifically configured to determine, based on currents of the plurality of boost circuits, that a boost circuit whose input side has a backflow current in the plurality of boost circuits is short-circuited.

Optionally, the input sides of the plurality of boost circuits are connected to a plurality of photovoltaic strings in a one-to-one correspondence manner. A direct current/alternating current inverter module is specifically configured to: convert a direct current into an alternating current, and then output the alternating current to a grid.

Figure 16:
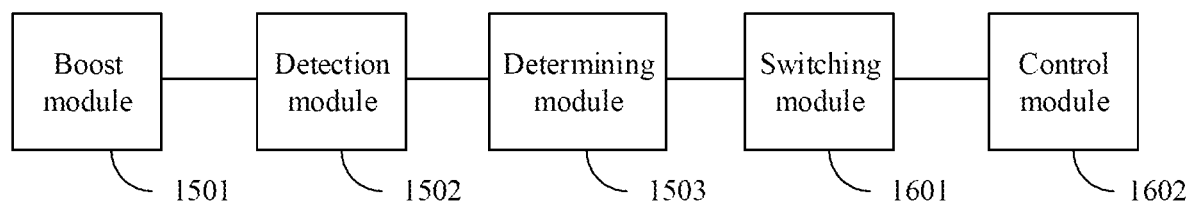
FIG. 16 is a schematic diagram of a structure of another embodiment of an apparatus for detecting a short circuit of an inverter according to this application.

FIG. 16 is a schematic diagram of a structure of another embodiment of an inverter detection apparatus according to this application. On a basis of the embodiment shown in FIG. 15, the apparatus shown in FIG. 16 further includes a switching module 1601 and a control module 1602. The switching module 1601 is configured to switch, to a working state, a boost circuit that is not short-circuited in the plurality of boost circuits. The control module 1602 is configured to control, to be lower than a preset power, an output power of a photovoltaic string connected to the boost circuit that is not short-circuited, to protect a photovoltaic string connected to the short-circuited boost circuit.

Optionally, the control module 1602 is specifically configured to control, to be less than a third voltage, a voltage of an output side of the boost circuit that is not short-circuited, so that the output power of the photovoltaic string connected to the boost circuit that is not short-circuited is lower than the preset power, where the third voltage is a voltage that is of an output side of the short-circuited boost circuit and that exists when the plurality of boost circuits are all in a non-working state.

Optionally, the switching module 1601 may be further configured to switch the plurality of boost circuits to a non-working state.

Optionally, in the foregoing embodiments, the boost module 1501 is specifically configured to: determine a first boost circuit whose input side has a lowest voltage in the plurality of boost circuits; and switch the first boost circuit to a working state, where a direct current that is output by the first boost circuit to the common bus in a working state is used to increase the voltage of the common bus from the first voltage to the second voltage.

Optionally, in the foregoing embodiments, the boost module 1501 is specifically configured to: determine a second boost circuit from the plurality of boost circuits; and switch the second boost circuit to a working state, and control the second boost circuit to boost a direct current of an input side based on a duty cycle less than a preset threshold, and then output the direct current to the common bus, where the direct current is used to increase the voltage of the common bus from the first voltage to the second voltage.

Optionally, in the foregoing embodiments, the inverter detected by the apparatus further includes an alternating current/direct current rectifier module, an input side of the alternating current/direct current rectifier module is connected to an output side of the direct current/alternating current rectifier module, and an output side of the alternating current/direct current rectifier module is connected to the common bus. In this case, the boost module 1501 is specifically configured to: convert an alternating current into a direct current by using the alternating current/direct current rectifier module, and output the direct current to the common bus, where the direct current that is output by the alternating current/direct current rectifier module is used to increase the voltage of the common bus from the first voltage to the second voltage.

Figure 17:
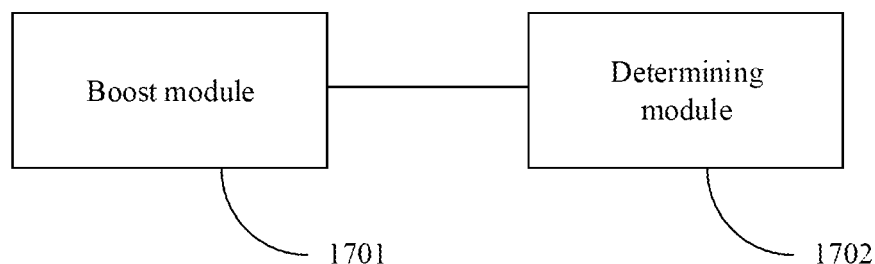
FIG. 17 is a schematic diagram of a structure of still another embodiment of an apparatus for detecting a short circuit of an inverter according to this application.

FIG. 17 is a schematic diagram of a structure of still another embodiment of an inverter detection apparatus according to this application. The apparatus shown in FIG. 17 may be configured to perform the method described in FIG. 12, and is configured to detect whether an inverter is short-circuited. The apparatus includes a boost module 1701 and a determining module 1702. The boost module 1701 is configured to: when a plurality of boost circuits are all in a non-working state, increase a voltage of a common bus from a first voltage to a second voltage. The second voltage is greater than the first voltage, and the first voltage is equal to a highest voltage in voltages of input sides of the plurality of boost circuits. The determining module 1702 is configured to detect a short-circuited boost circuit in the plurality of boost circuits based on a state of an overcurrent protector in each boost circuit in the plurality of boost circuits.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 18:
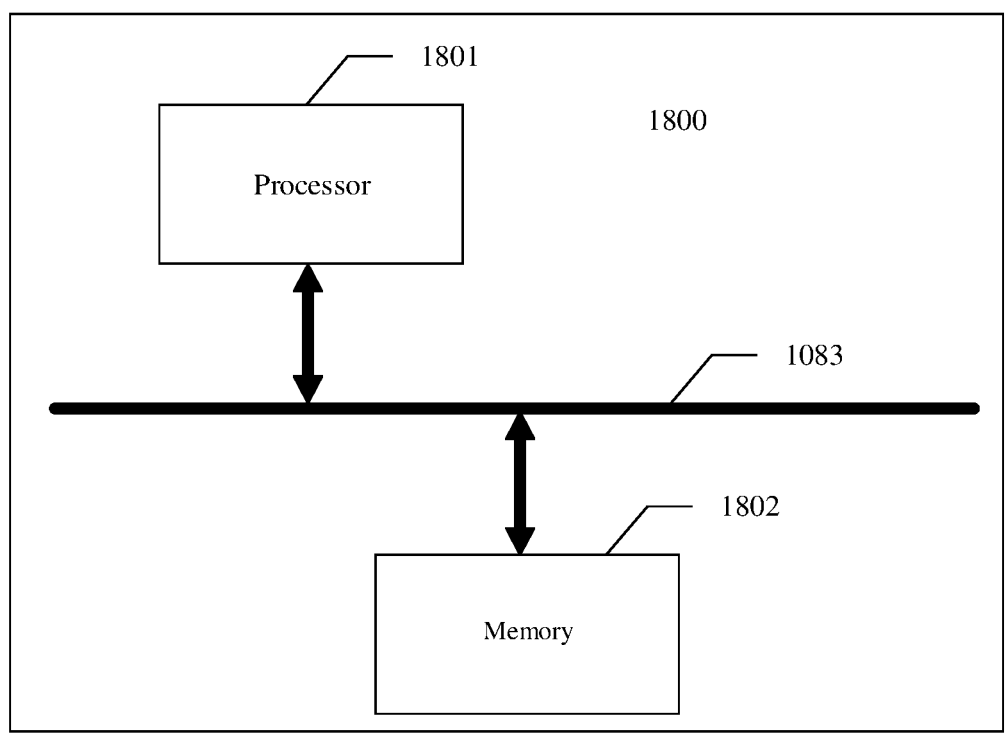
FIG. 18 is a schematic diagram of a structure of an apparatus according to an embodiment of this application.

FIG. 18 is a schematic diagram of a structure of an apparatus according to an embodiment of this application. The apparatus may be configured to perform the method for detecting a short circuit of an inverter in the foregoing embodiments of this application, and may be an apparatus for detecting a short circuit of an inverter. As shown in FIG. 18, the apparatus 1800 may include a processor 1801 (for example, a CPU) and a memory 1802. The memory 1802 may include a high-speed random access memory (RAM), and may further include a non-volatile memory (NVM), for example, at least one magnetic disk storage. The memory 1802 may store various instructions, to complete various processing functions and implement method steps of this application. Optionally, the apparatus 1800 in this application may further include a communication bus 1803. The communications bus 1803 is configured to implement a communication connection between components.

In this embodiment, the memory 1802 is configured to store computer executable program code. The program code includes instructions. When the processor 1801 executes the instructions, the instructions enable the processor 1801 of the apparatus to perform a processing action of the processor in any one of the foregoing embodiments or the optional embodiments of this application. Implementation principles and technical effects thereof are similar, and details are not described herein again.

The term "a plurality of" in this specification refers to two or more than two. The term "and/or" in this specification describes only an association relationship for describing associated objects and indicates that there may be any one of three relationships. For example, A and/or B may represent any one of the following three cases: Only A exists, both A and B exist, or only B exists. In addition, the character "/" in this specification usually indicates an "or" relationship between the associated objects. In the formula, the character "/" indicates a "division" relationship between the associated objects.

It may be understood that various numerals in embodiments of this application are merely used for differentiation for ease of description, and are not intended to limit the scope of embodiments of this application.

It may be understood that in embodiments of this application, sequence numbers of the foregoing processes do not mean execution sequences. The execution sequences of the processes should be determined based on functions and internal logic of the processes, and should not be construed as any limitation on the implementation processes of embodiments of this application.

It may be understood that, in embodiments of this application, the memory may be a non-volatile memory, such as a hard disk drive (HDD) or a solid-state drive (SSD), or may be a volatile memory, such as a random access memory (RAM). The memory is any other medium that can be configured to carry or store expected program code in a form of instructions or a data structure and that can be accessed by a computer, but is not limited thereto. The memory in embodiments of this application may alternatively be a circuit or any other apparatus that can implement a storage function, and is configured to store the program instructions and/or the data.

Based on the foregoing descriptions of the implementations, a person skilled in the art may clearly understand that for the purpose of convenient and brief descriptions, division into the foregoing functional modules is merely used as an example for illustration. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in another manner. For example, the described apparatus embodiment is merely an example. For example, the division into the modules or units is merely logical function division, and may be other division in actual implementation. For example, a plurality of units or components may be combined, or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, that is, may be located in one place, or may be distributed on a plurality of different places. Some or all of the units may be selected depending on actual requirements to achieve the objectives of the solutions in the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

A method provided in embodiments of this application may be completely or partially implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for detecting a short circuit of an inverter, performed by the inverter, wherein the inverter comprises a plurality of boost circuits, a common bus, and a direct current/alternating current inverter module, output sides of the plurality of boost circuits are all connected in parallel with the common bus, the common bus is further connected in parallel with the direct current/alternating current inverter module, a direct current is input into an input side of each of the plurality of boost circuits, the boost circuit is configured to: after performing boost processing on the direct current, send the direct current to the direct current/alternating current inverter module by using the common bus, the direct current/alternating current inverter module is configured to: convert the boosted direct current into an alternating current, and then output the alternating current, and the method comprises:
when the plurality of boost circuits areas all in a non-working state, increasing a voltage of the common bus from a first voltage to a second voltage, wherein the first voltage is equal to a highest voltage in voltages of the input sides of the plurality of boost circuits;
detecting a circuit parameter of the input side of each boost circuit in the plurality of boost circuits; and
detecting a short-circuited boost circuit in the plurality of boost circuits based on the circuit parameters of the plurality of boost circuits,
wherein
the input sides of the plurality of boost circuits are connected to a plurality of photovoltaic strings in a one-to-one correspondence manner; and
the direct current/alternating current inverter module is further configured to: convert the direct current into the alternating current, and then output the alternating current to a grid,
wherein, after the detecting a short-circuited boost circuit in the plurality of boost circuits, the method further comprises:
switching, to a working state, a boost circuit that is not short-circuited in the plurality of boost circuits; and
controlling, to be lower than a preset power, an output power of a photovoltaic string connected to the boost circuit that is not short-circuited, to protect a photovoltaic string connected to the short-circuited boost circuit.

2. The method according to claim 1, wherein the circuit parameter is a voltage; and
the detecting a short-circuited boost circuit in the plurality of boost circuits based on the circuit parameters of the plurality of boost circuits comprises:
detecting, based on voltages of the plurality of boost circuits, that a boost circuit having a voltage at its input side equal to the second voltage in the plurality of boost circuits is short-circuited.

3. The method according to claim 1, wherein the circuit parameter is a current; and
the detecting a short-circuited boost circuit in the plurality of boost circuits based on the circuit parameters of the plurality of boost circuits comprises:
detecting, based on currents of the plurality of boost circuits, that a boost circuit having a backflow current at its input side in the plurality of boost circuits is short-circuited.

4. The method according to claim 1, wherein the controlling, by using the boost circuit that is not short-circuited to be lower than a preset power, an output power of a photovoltaic string connected to the boost circuit that is not short-circuited comprises:
controlling, to be less than a third voltage, a voltage of an output side of the boost circuit that is not short-circuited, so that the output power of the photovoltaic string connected to the boost circuit that is not short-circuited is lower than the preset power, wherein the third voltage is a voltage that is of an output side of the short-circuited boost circuit and that exists when the plurality of boost circuits are all in a non-working state.

5. The method according to claim 1, before the increasing a voltage of the common bus from a first voltage to a second voltage, further comprising:
switching the plurality of boost circuits to a non-working state.

6. The method according to claim 1, wherein the increasing a voltage of the common bus from a first voltage to a second voltage comprises:
detecting a first boost circuit having a lowest voltage at its input side in the plurality of boost circuits; and
switching the first boost circuit to a working state, wherein a direct current that is output by the first boost circuit to the common bus in a working state is used to increase the voltage of the common bus from the first voltage to the second voltage.

7. The method according to claim 1, wherein the increasing a voltage of the common bus from a first voltage to a second voltage comprises:
detecting a second boost circuit from the plurality of boost circuits; and
switching the second boost circuit to a working state, and controlling the second boost circuit to boost a direct current of an input side based on a duty cycle less than a preset threshold, and then output the direct current to the common bus, wherein the direct current is used to increase the voltage of the common bus from the first voltage to the second voltage.

8. The method according to claim 1, wherein
the inverter further comprises an alternating current/direct current rectifier module, an input side of the alternating current/direct current rectifier module is connected to an output side of the direct current/alternating current rectifier module, and an output side of the alternating current/direct current rectifier module is connected to the common bus; and
the increasing a voltage of the common bus from a first voltage to a second voltage comprises:
converting an alternating current into a direct current by using the alternating current/direct current rectifier module, and outputting the direct current to the common bus, wherein a direct current output by the alternating current/direct current rectifier module is used to increase the voltage of the common bus from the first voltage to the second voltage.

9. An inverter, comprising:
a plurality of boost circuits, a common bus, and a direct current/alternating current inverter module, wherein
output sides of the plurality of boost circuits are all connected in parallel with the common bus, the common bus is further connected in parallel with the direct current/alternating current inverter module, a direct current is input into an input side of each boost circuit, the boost circuit is configured to: after performing boost processing on the direct current, send the direct current to the direct current/alternating current inverter module by using the common bus, and the direct current/alternating current inverter module is configured to: convert the boosted direct current into an alternating current, and then output the alternating current; and
a switching transistor in each boost circuit is connected in series with an overcurrent protector, and the overcurrent protector is configured to be disconnected when a current flowing through the switching transistor is excessively large, to perform overcurrent protection, wherein
the input sides of the plurality of boost circuits are connected to a plurality of photovoltaic strings in a one-to-one correspondence manner; and
the direct current/alternating current inverter module is further configured to: convert the direct current into the alternating current, and then output the alternating current to a grid,
wherein the inverter further comprises:
a switch, configured to switch, to a working state, a boost circuit that is not short-circuited in the plurality of boost circuits; and
a controller, configured to control, to be lower than a preset power, an output power of a photovoltaic string connected to the boost circuit that is not short-circuited, to protect a photovoltaic string connected to a short-circuited boost circuit.

10. The inverter according to claim 9, wherein the inverter comprising an apparatus for detecting a short circuit of the inverter, and the apparatus is configured to:
detect a circuit parameter of the input side of each boost circuit in the plurality of boost circuits; and
detect a short-circuited boost circuit in the plurality of boost circuits based on the circuit parameters of the plurality of boost circuits.

11. The inverter according to claim 10, wherein the circuit parameter is a voltage; and
the apparatus is further configured to detect, based on voltages of the plurality of boost circuits, that a boost circuit having a voltage at its input side equal to a second voltage in the plurality of boost circuits is short-circuited.

12. The inverter according to claim 10, wherein the circuit parameter is a current; and
the apparatus is further configured to detect, based on currents of the plurality of boost circuits, that a boost circuit having a backflow current at its input side in the plurality of boost circuits is short-circuited.

13. The inverter according to claim 9, wherein
the controller is further configured to control, to be less than a third voltage, a voltage of an output side of the boost circuit that is not short-circuited, so that the output power of the photovoltaic string connected to the boost circuit that is not short-circuited is lower than a preset power, wherein the third voltage is a voltage that is of an output side of the short-circuited boost circuit and that exists when the plurality of boost circuits are all in a non-working state.

14. The inverter according to claim 9, further comprising:
a switch, configured to switch the plurality of boost circuits to a non-working state.

15. The inverter according to claim 9, wherein the boost circuit is further configured to:
detect a first boost circuit having a lowest voltage at its input side in the plurality of boost circuits; and
switch the first boost circuit to a working state, wherein a direct current that is output by the first boost circuit to the common bus in a working state is used to increase a voltage of the common bus is increased from a first voltage to a second voltage.

16. The inverter according to claim 9, wherein the boost circuit is further configured to:
detect a second boost circuit from the plurality of boost circuits; and
switch the second boost circuit to a working state, and control the second boost circuit to boost a direct current of an input side based on a duty cycle less than a preset threshold, and then output the direct current to the common bus, wherein the direct current is used to increase a voltage of the common bus from a first voltage to a second voltage.

* * * * *

UNITED STATES PATENT AND TRADEMARK OFFICE
CERTIFICATE OF CORRECTION

PATENT NO. : 12,199,522 B2
APPLICATION NO. : 17/826395
DATED : January 14, 2025
INVENTOR(S) : Zhiwu Xu et al.

Page 1 of 1

It is certified that error appears in the above-identified patent and that said Letters Patent is hereby corrected as shown below:

In the Claims

Column 23, Claim 1, Line 63, change "circuits areas" to -- circuits is --.

Signed and Sealed this
Eleventh Day of February, 2025

Coke Morgan Stewart
*Acting Director of the United States Patent and Trademark Office*